(12) United States Patent
Betting et al.

(10) Patent No.: US 6,524,368 B2
(45) Date of Patent: Feb. 25, 2003

(54) SUPERSONIC SEPARATOR APPARATUS AND METHOD

(75) Inventors: M. Betting, Rijswijk (NL); Th. van Holten, Delft (NL); J. M. H. M. van Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/992,275

(22) Filed: Nov. 14, 2001

(65) Prior Publication Data

US 2002/0194988 A1 Dec. 26, 2002

Related U.S. Application Data

(63) Continuation of application No. 09/223,884, filed on Dec. 31, 1998, now abandoned.

(51) Int. Cl.[7] ............................................. B01D 45/04
(52) U.S. Cl. ............................................. 95/29; 96/389
(58) Field of Search .......................... 96/389; 95/29, 95/32, 31, 34; 55/468, DIG. 14

(56) References Cited

U.S. PATENT DOCUMENTS

| | | | | |
|---|---|---|---|---|
| 3,185,181 A | 5/1965 | Demyan | .................. | 138/37 |
| 3,544,170 A | 12/1970 | Bowles | .................. | 302/28 |
| 3,559,373 A | 2/1971 | Garrett | .................. | 55/9 |
| 3,616,596 A | 11/1971 | Campargue | .................. | 55/17 |
| 3,626,665 A | 12/1971 | Fenn et al. | .................. | 55/17 |
| 3,725,271 A | 4/1973 | Giannotti | .................. | 210/65 |
| 3,892,070 A | 7/1975 | Bose | .................. | 60/279 |
| 3,894,851 A | 7/1975 | Gorman | .................. | 55/94 |
| 4,292,050 A | 9/1981 | Linhardt et al. | .................. | 55/1 |
| 4,541,845 A | 9/1985 | Michel-Kim | .................. | 55/17 |
| 5,261,242 A | 11/1993 | Lardinois | .................. | 62/11 |
| 6,280,502 B1 * | 8/2001 | van Veen et al. | | |

FOREIGN PATENT DOCUMENTS

| | | | | |
|---|---|---|---|---|
| EP | 496128 | 7/1992 | ............ | B01D/53/24 |
| GB | 2037610 A | 7/1980 | | |
| JP | 63-165849 | 7/1988 | | |
| JP | 2-17921 | 1/1990 | | |
| SU | 593717 | 2/1976 | ............ | B01D/45/06 |
| SU | 1768242 A1 | 10/1992 | ............ | B01D/45/12 |
| WO | WO99/01194 | * | 1/1999 | |

* cited by examiner

Primary Examiner—Duane S. Smith

(57) ABSTRACT

An apparatus and method of removing a selected component from a stream of fluid containing a plurality of components is provided. The stream is induced to flow at supersonic velocity through a conduit so as to decrease the temperature of the fluid to below a selected temperature at which one of condensation and solidification of the selected component occurs, thereby forming particles of the selected component. The conduit is provided with a structure for imparting a swirling motion to the stream of fluid thereby inducing the particles to flow to a radially outer section of a collecting zone in the stream. A shock wave is created in the stream so as to decrease the axial velocity of the fluid to subsonic velocity, and to increase the swirling motion of the particles which are extracted into an outlet stream from the radially outer section of the collecting zone downstream of the shock wave.

26 Claims, 25 Drawing Sheets

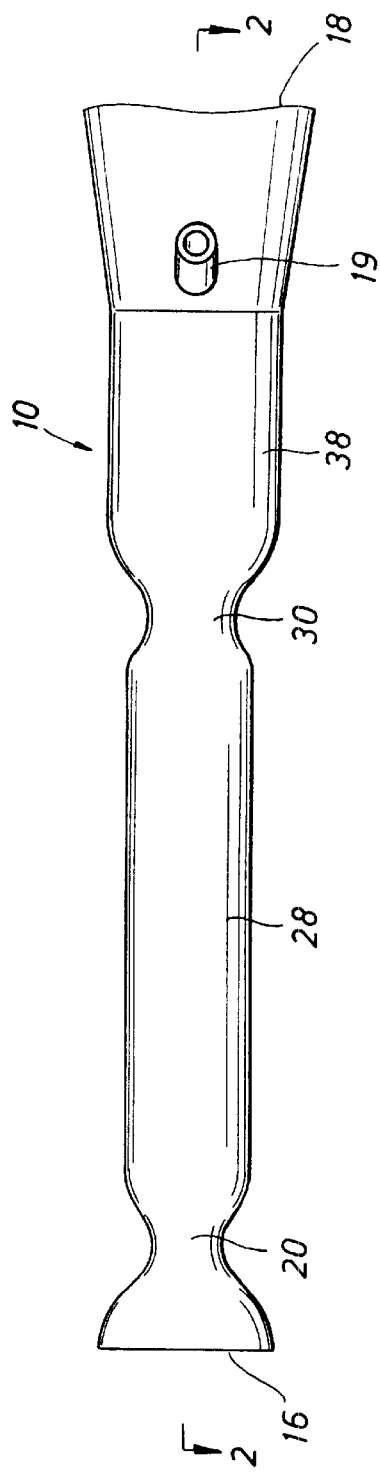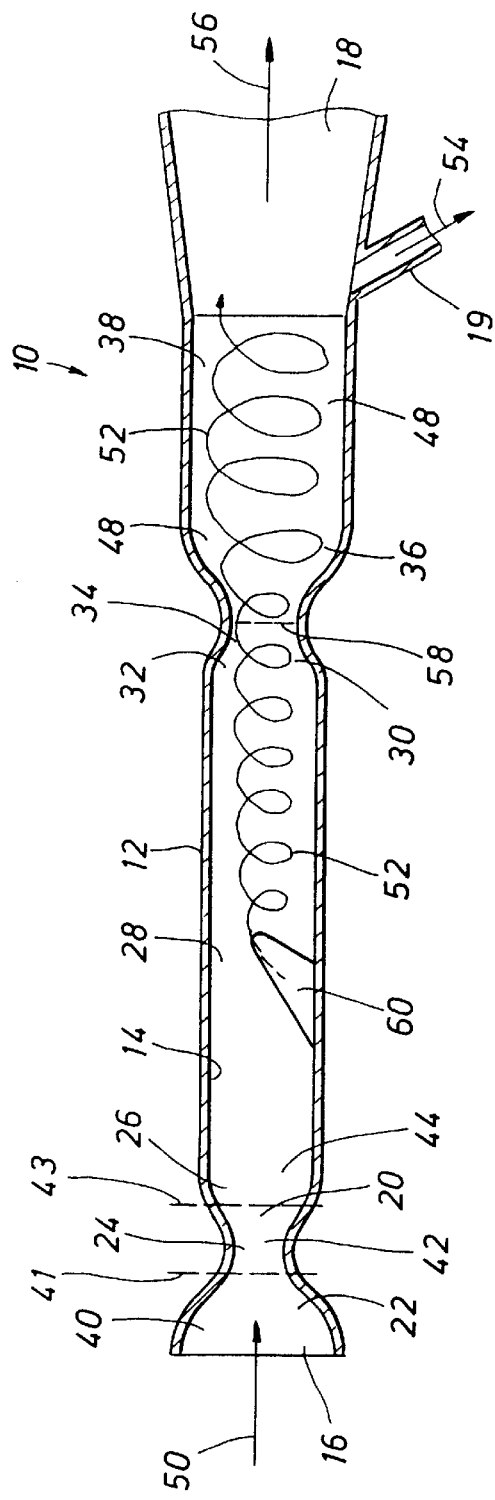

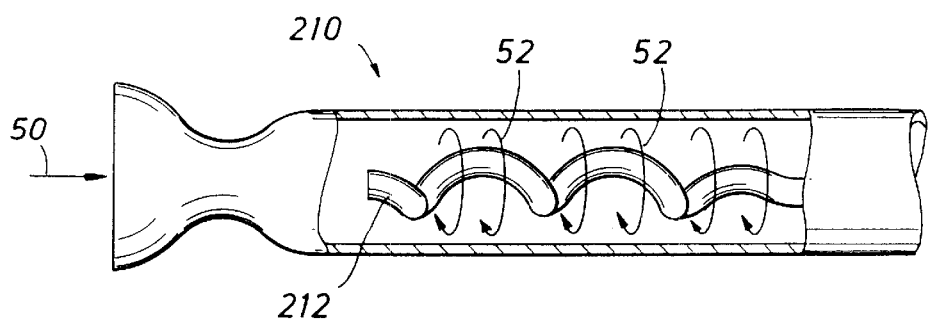
FIG.11
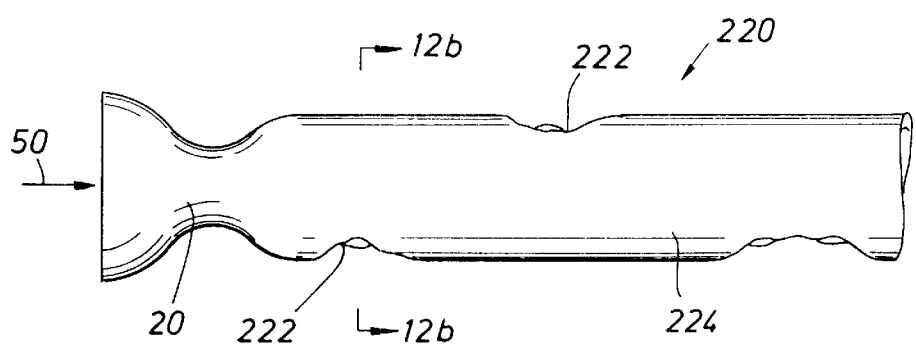
FIG.12a
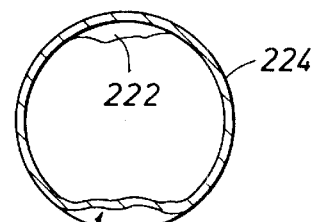
FIG.12b
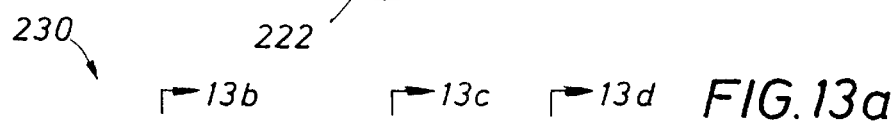
FIG.13a
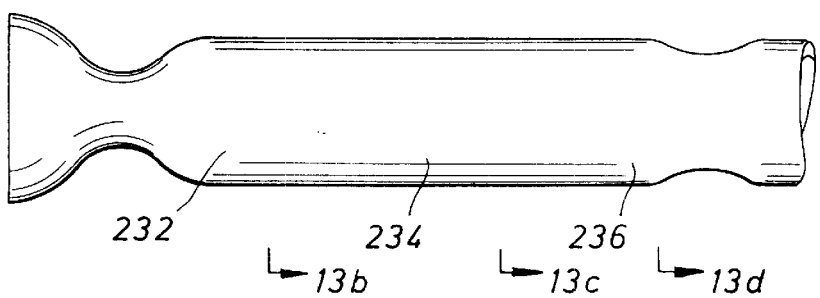
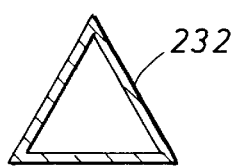
FIG.13b
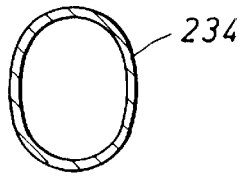
FIG.13c
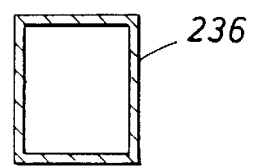
FIG.13d FIG.17a
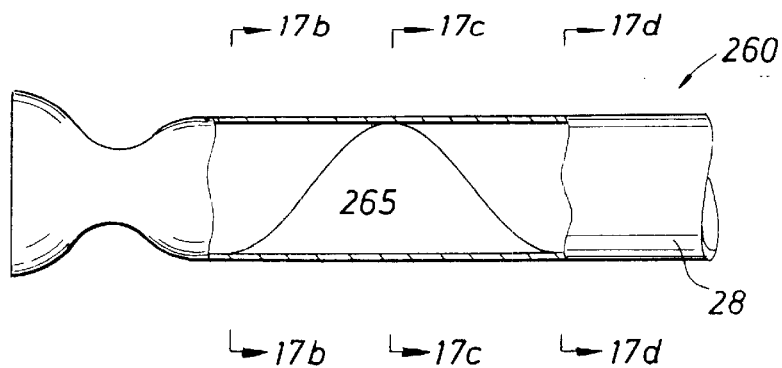
FIG.17b
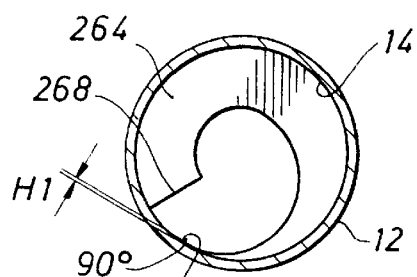
FIG.17c
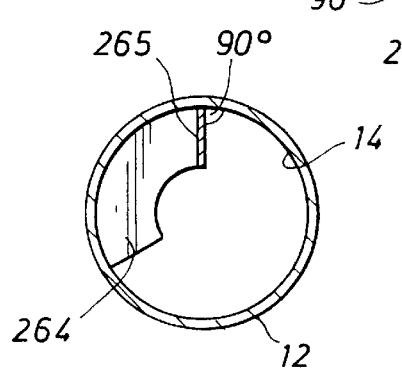
FIG.17d
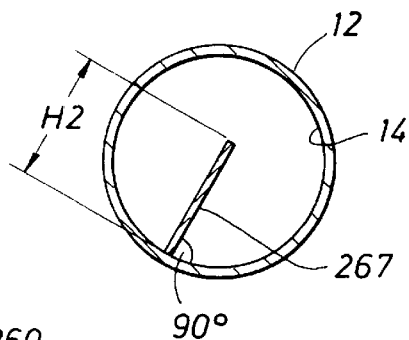
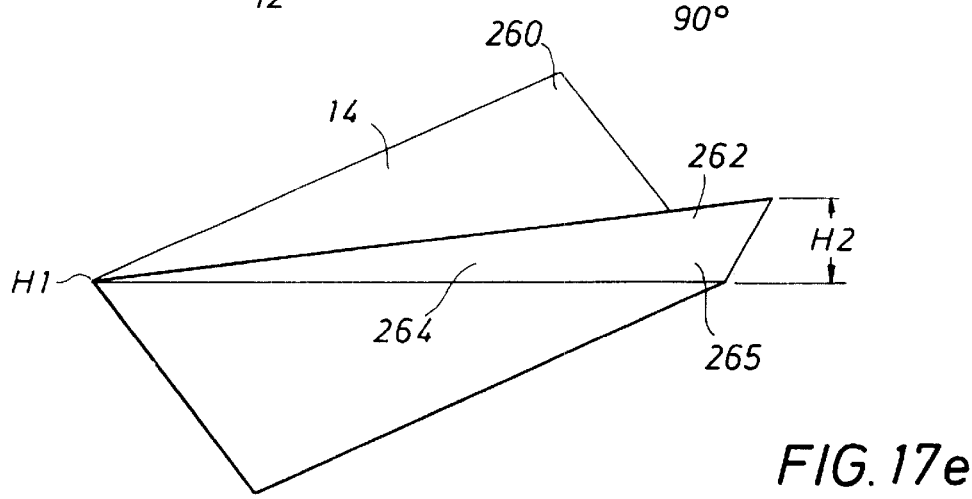
FIG.17e

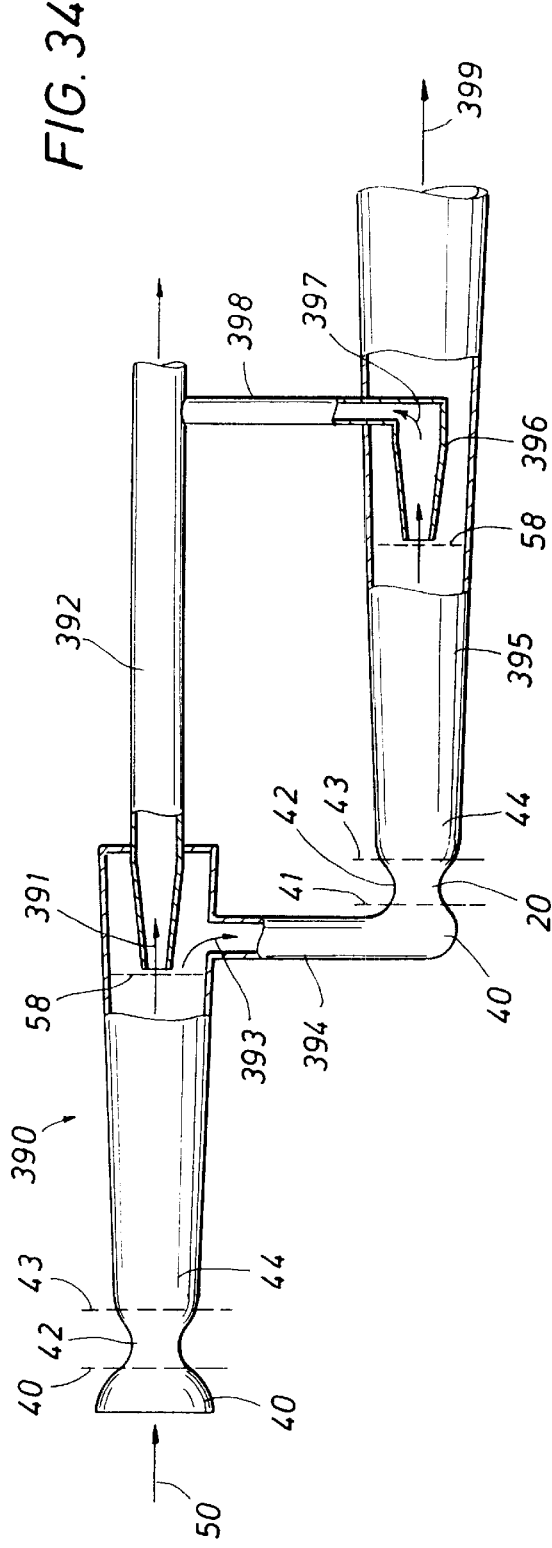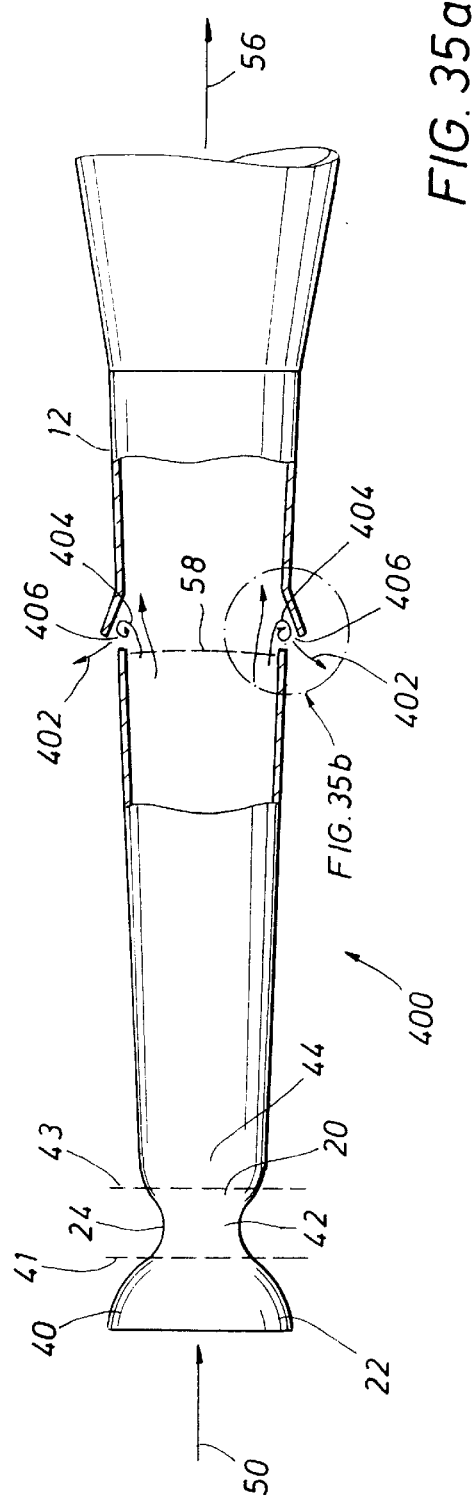

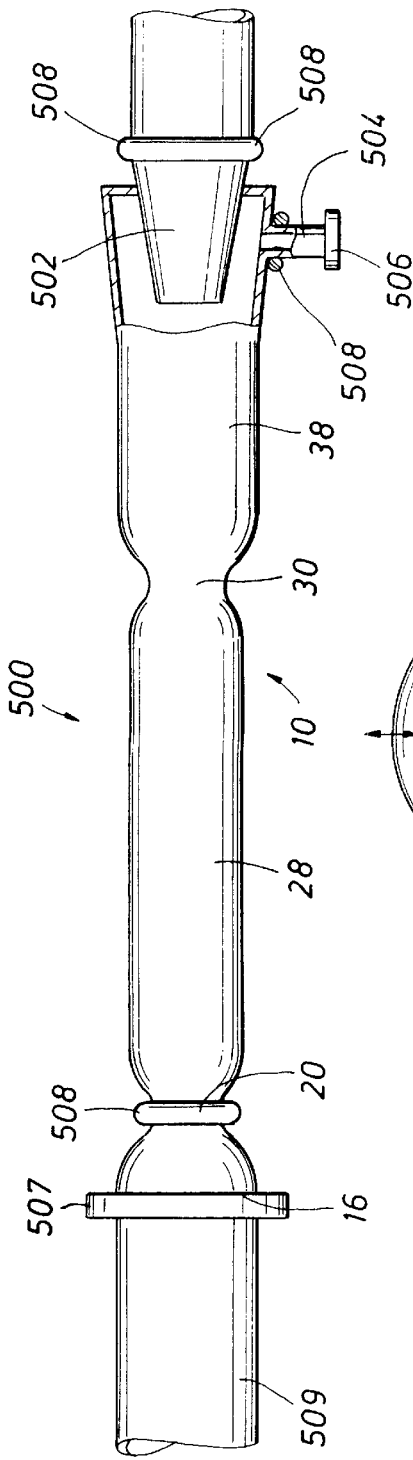
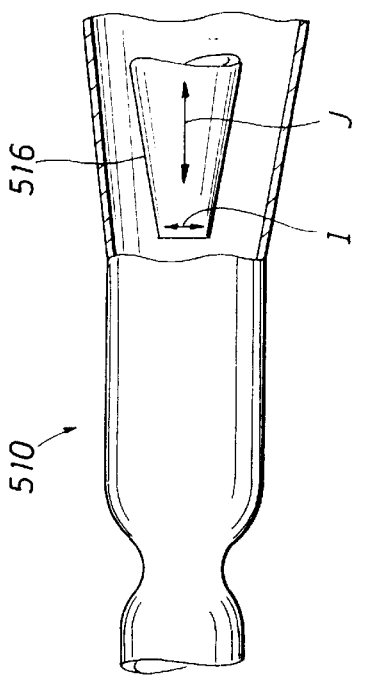
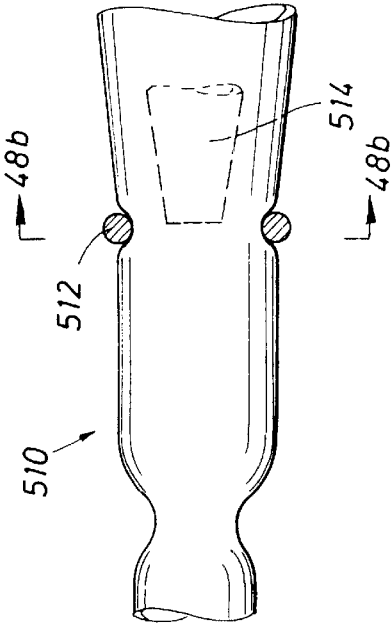

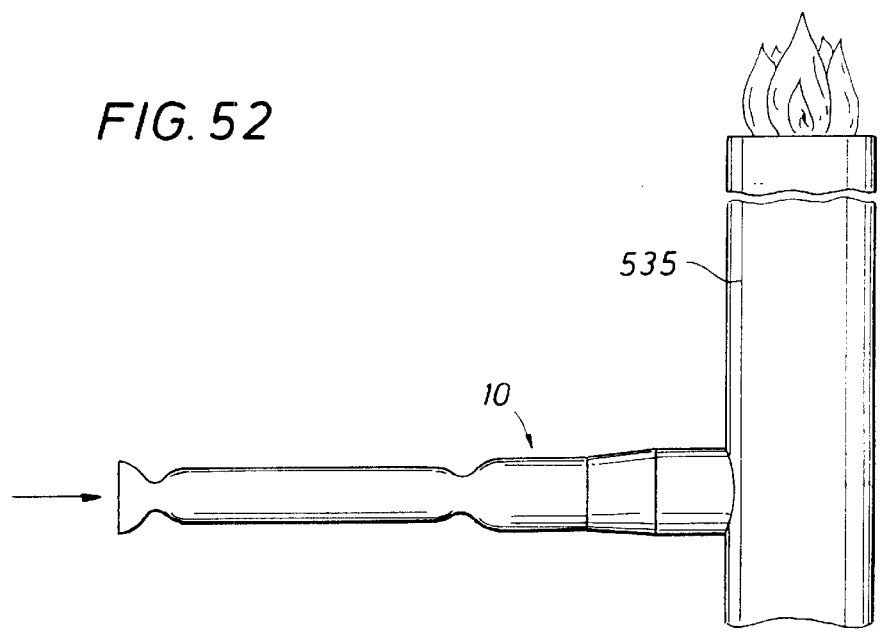
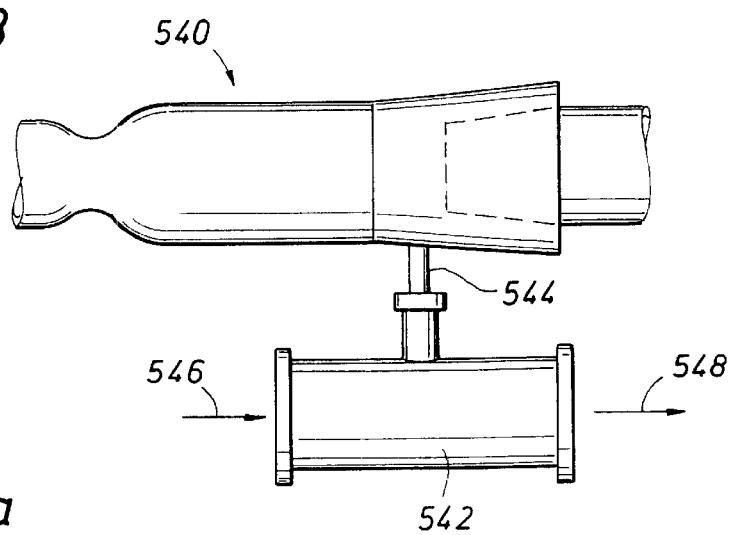
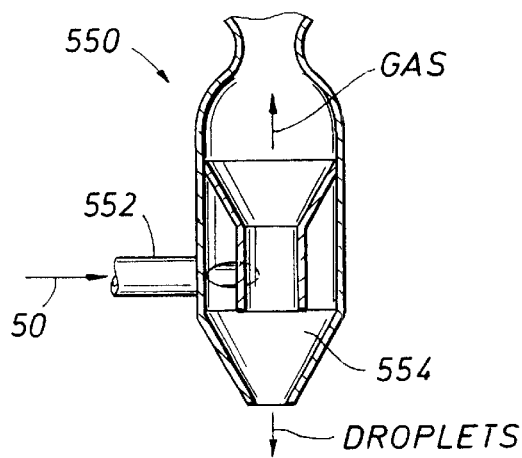
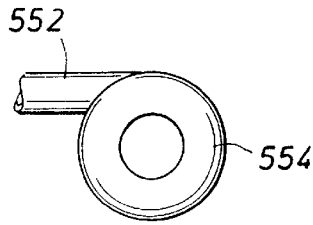

SWEEP BACK ANGLE

SUPERSONIC SEPARATOR APPARATUS AND METHOD

This is a continuation of application Ser. No. 09/223,884 filed Dec. 31, 1998, the entire disclosure of which is hereby incorporated by reference, now abandoned.

FIELD OF THE INVENTION

The present invention relates to separation of one or more selected components from a stream of fluid containing a plurality of components. More particularly the invention relates to apparatus and methods for removal of selected components from a fluid stream by decreasing the temperature of the fluid to below a selected temperature at which one of condensation and solidification of the selected components occurs thereby forming particles of the selected components, and separating the particles from the stream. Such separation apparatus and methods have application in various processes, for example in drying and removal of nitrogen from natural gas, removal of noxious components from flue gas, in air-conditioning (water removal), and in concentrations or enriching vapors in front of condensors.

BACKGROUND OF THE INVENTION

Numerous methods and apparatus exist for separating components from a fluid flow containing gases, liquids and/or solids. Conventional separation apparatus include distillation columns, filters and membranes, settling tanks, centrifuges, electrostatic precipitators, dryers, chillers, cyclones, vortex tube separators, and adsorbers. There are disadvantages associated with each of these conventional apparatus which make them undesirable for certain applications.

For example, distillation columns, electrostatic precipitators and dryers are generally large in size, have long residence times, and require high energy input. In addition, these devices are relatively ineffective in separating gaseous mixtures.

Filtration and membrane separation of solid particles from a fluid includes the removal of particles from the fluid by use of a filter or membrane specifically tailored to remove particles from the fluid while allowing the fluid to pass through the filter or membrane. Thus, filters and membrane separation requires that the membrane, filter cake or other similar filtration aid be regenerated or discarded after separation adding increased costs to the process. Additionally, filters and membranes have a long residence time. Settling tanks also have a long residence time and often require additional treatment, such as filtration or centrifugation.

Centrifuges and cyclones both use centrifugal force to achieve separation. Centrifugal separators can achieve separation of immiscible or insoluble components from a fluid medium; however, centrifugal separators require mechanical acceleration of up to 20,000 G. The mechanical parts and energy needed to achieve these velocities make centrifugal separators costly to operate to effectively remove components from a fluid. Cyclones are used to separate gaseous components from gas-liquid fluid flows by way of turbulent vortex flow. Vortices are created in a fluid flow so that heavier particles and/or liquid droplets move radially outward in the vortex, thus becoming separated from gaseous components. Considerable external energy must be added to cyclones to achieve effective separation.

Apparatus and processes exist for creating droplets from a fluid, which are then separated from the fluid. Examples of such apparatus include chillers, throttling valves, turboexpanders and vortex tube separators. Chillers create droplets and may also create hydrates which can clog downstream flow systems.

A turboexpander is an apparatus which reduces the pressure of a feed gas stream. In so doing, useful work may be extracted during the pressure reduction. Furthermore, an effluent stream may also be produced from the turboexpander. This effluent may be passed through a separator or distillation column to separate the effluent into a heavy liquid stream. Turboexpanders utilize rotating equipment, which is relatively expensive. Such equipment requires a high degree of maintenance and, because of the moving parts, has a higher incidence of mechanical breakdown.

In addition, turboexpanders are poorly suited for certain applications, such as for feed gas streams with entrained water.

Vortex tube separators are devices for chilling gas by expansion. A gas is introduced into the vortex tube separator through a header across tangential inlet nozzles. The gas may reach near sonic velocity as it passes into the vortex tube. Condensation occurs during the near adiabatic expansion of the gas. The condensate is forced toward the outer wall of the vortex tube. Simultaneously, gas moves from the wall to the center of the tube. By removing the liquid phase from the tube wall it is possible to separate the gas and liquid phases. Vortex tube separators are not particularly efficient and the fluid flow is limited to subsonic velocities.

Japanese Patent Application No. 63-165849 refers to the separation of a gaseous mixture through the use of supersonic flow. The device includes a subsonic swirler positioned upstream of a supersonic nozzle. The swirling fluid stream passes through an axially symmetric expansion nozzle to reach supersonic velocity and form fine particles. In order to separate a component from the gas flow, a large upstream swirl must be initially provided by the swirler and a significant amount of energy therefore must be input to the system. The system undergoes a large pressure drop and an oblique shock wave occurs downstream after the separation.

U.S. Pat. No. 3,559,373 (Garrett) refers to a supersonic flow separator including a high pressure gas inlet, a rectangularly-shaped throat, and a U-shaped rectangular-cross sectional channel. The channel includes an outer curved permeable wall. A gas stream is provided to the gas inlet. The gas converges through the throat and expands into the channel, increasing the velocity to supersonic. The expansion of the flow in the supersonic region results in droplets which pass through the outer permeable wall and are collected in a chamber. The force available to separate out the droplets is dependent on the radius of the curvature of the channel. The radius of the curvature of the channel, however, must be limited to prevent undesirable shock waves. Therefore, the U-shaped configuration limits the force available for separating out liquid droplets from the flow stream. Further, liquid droplets are collected across only a limited area of the channel.

European Patent Publication No. 496,128 refers to a method and device for separating a gas from a gas mixture. The device includes a cylinder which converges to a nozzle. Gas enters an inlet port of the cylinder at subsonic speeds, flows through a converging section of the nozzle and then out of a diverging section at supersonic velocity. A pair of delta-shape plates arranged in the gas flow generate a vortex. The combination of the supersonic velocities and the vortex allow for condensation and centrifugal force to move a condensed component to an edge zone of the cylinder. An outlet pipe is positioned centrally within the cylinder to allow discharge of the gaseous components of the flow stream at supersonic velocity. The condensed component continues on through a second diverging section, which drops the velocity to subsonic, and through a fan, ultimately exiting the cylinder through a second outlet. The device includes some inherent flaws which inhibit its ability to effectively separate components. Specifically, the change in temperature experienced by the flow stream in the supersonic region over time is too great to grow large particles and therefore the gaseous component of the flow stream still contains substantial amounts of fine liquid particulates. Further, discharge of the gaseous components occurs at supersonic velocities, and thus no final controlled shock wave is utilized to assist in separation.

What is needed is a separation apparatus and method that provides high separation efficiency while avoiding or minimizing pressure drop, maintenance costs, and the need to supply external energy.

SUMMARY OF THE INVENTION

The present invention provides an apparatus and method to separate one or more selected components from a compressible fluid containing a plurality of components. The term "compressible fluid" herein shall be understood to mean any gases, gas-liquid mixtures, liquids near their bubble point or dew point, emulsions, and any combination of any of the foregoing, so long as the fluid is sufficiently compressible such that it can be propelled to supersonic velocity via expansion. Preferred compressible fluids include, for example, natural gases, flue gases, and air-water mixtures. The expanding fluid reaches extremely low temperatures, which results in a condensation product. This condensation product can include water and heavier hydrocarbons which must be removed from natural gas if contractual sales specifications are to be met.

The present invention provides a supersonic separator apparatus and method having an improved supersonic nozzle for forming particles of a separable size. The apparatus further includes an intermediate portion through which a compressible fluid stream flows at supersonic velocity and, preferably, a structure for imparting a tangential component to the fluid stream, as well as a collection mechanism to extract one or more components from the fluid stream.

In a preferred embodiment, the mixture of gas and liquid or other droplets or particles enters a swirl imparting section at supersonic velocity. The swirl imparting or intermediate section of the conduit may include a wing. On the leading edge of a preferred wing profile, a strong vortex is generated, forcing the condensed particles toward the wall of the conduit. A liquid film is built up against the inner wall moving helically due to shear forces acting between the swirling gas and the liquid film. The liquid film is transported outside the main conduit via a liquid drainage system, which can be, for example, a co-axial tube or perforations or slits in the conduit.

Although this invention is generally described in terms of the separation of liquid particles (droplets), the invention is not so limited. It is to be understood that the invention may be utilized to separate solid particles from a fluid stream. U.S patent application Ser. No. [09/223,886], filed on even date herewith now U.S. Pat. No. 6,280,502 and of which the entire contents are incorporated herein by reference, discusses the separation of solid particles from compressible fluid streams.

Applications for the present invention include the oil and gas industry, including LPG, LNG, sour gas treatment, downhole and subsea applications, and also, for example, air-conditioning, (convection) drying processes (for e.g., paper, textile, and food processing industries), dust removal, heat pumps (energy savings) and the removal of $CO_2$, $N_2$, $NO_x$, $H_2S$ and other materials from flue gases. U.S. patent applications Ser. Nos. [09/223,885 and 09/223,887], both now abandoned both filed on even date herewith and of which the entire contents of both are incorporated herein by reference, discuss, respectively, application of the present invention in downhole and subsea wellhead applications.

The present invention also provides an apparatus and method for capturing a shock wave and for enforcing and strengthening a vortex swirl flow. Additionally, the present invention provides arrangements for extracting particles, enhancing drainage, liquid production, and pressure recovery.

According to a particularly preferred embodiment of the present invention, the separation apparatus includes various structures for imparting of tangential component to the axial velocity of the fluid stream. As an input fluid stream enters a conduit according to several embodiments of the invention, its velocity is substantially in an axial direction. As the fluid stream increases to supersonic velocity in a supersonic passageway of the conduit, it comes in contact with and flows over a wing or other swirl imparting structure. The swirl imparting structure causes the stream to alter its direction tangentially and begin to swirl through the remainder of the supersonic passageway. The velocity of the swirl flow in the supersonic passageway is still supersonic, and there remains a supersonic axial velocity.

Another preferred embodiment of the invention is the creation of a final shock wave in a deceleration zone of the conduit. When fluid flow passes from supersonic to subsonic velocity, a shock wave is created. The supersonic velocity can be reduced to subsonic by any suitable method or structure for causing a shock wave. Preferably, the shock wave is a controlled, final shock wave. A controlled shock wave is one which occurs as a matter of design intent and based upon the geometry of the conduit. A final shock wave is one in which the velocity downstream of the wave is subsonic. Preferably the shock wave is created by inducing the stream of fluid to flow through a deceleration zone. A suitable deceleration zone is a diffuser, and suitable diffusers include subsonic and supersonic diffusers.

As the swirl flow enters a deceleration zone, and consequently decreases its axial velocity to the subsonic, the axial velocity component of the swirl flow diminishes. Thus, the axial velocity of the fluid stream decreases and the tangential velocity remains the same (or decreases to a smaller degree), so the swirl ratio, defined as the $V_{tan}/V_{axial}$ increases.

The present invention achieves enhanced separation of particles or droplets drifting in a vortex flow by, among other things, increasing the swirl ratio. In order to increase the swirl ratio within the supersonic vortex flow, the axial velocity component is decelerated. Just after the shock wave, the swirl ratio reaches its maximum. Separation efficiency is improved if collection of the particles takes place after the shock wave, i.e., in subsonic flow rather than in supersonic flow. The shock wave dissipates a substantial amount of kinetic energy of the fluid stream and thereby reduces the axial component of the fluid velocity while the tangential component either increases or remains substantially unchanged. As a result, the density of particles in the radially outer section of a collection section downstream of the deceleration zone is significantly higher than in the central portion of the conduit. Further, it is now possible for very small particles (less than one micron in size) to be separated. These effects are facilitated by the increased swirl ratio and a reduced tendency of the particles to be entrained by a central "core" of the stream, so that the particles are allowed to agglomerate in the radially outer section of the collection section, from which they can be subsequently extracted.

Further, the present invention provides for flow turndown, and controllability, as well as various particle nucleation enhancement and nucleation pulse interruption mechanisms, as will be described in detail below. The foregoing and other advantages and features of the invention will be more readily understood from the following detailed description of the invention, which is provided in connection with the accompanying drawings.

BRIEF DESCRIPTION OF THE DRAWINGS

FIG. 1 is a side view of a conduit constructed in accordance with an embodiment of the invention.

FIG. 2 is a cross-sectional view of the conduit of FIG. 1 taken along line I—I.

FIG. 11 is partial side view of a conduit with a cutaway section showing a helical shaped body constructed in accordance with another embodiment of the invention.

FIG. 12a is a partial side view of a dented conduit constructed in accordance with another embodiment of the invention.

FIG. 12b is a cross-sectional view of the conduit of FIG. 12a taken along line XII—XII.

FIG. 13a is a partial side view of a conduit constructed in accordance with another embodiment of the invention.

FIG. 13b is a cross-sectional view of the conduit of FIG. 13a taken along line XIIIb—XIIIb.

FIG. 13c is a cross-sectional view of the conduit of FIG. 13a taken along line XIIIc—XIIIc.

FIG. 13d is a cross-sectional view of the conduit of FIG. 13a taken along line XIIId—XIIId.

FIG. 15b is a front view of the inlet of the conduit of FIG. 15a.

FIG. 17a is a partial side view of a conduit with a cutaway section showing a distorted wing constructed in accordance with another embodiment of the invention.

FIG. 17b is a cross-sectional view of the conduit of FIG. 17a taken along line XVIIb—XVIIb.

FIG. 17c is a cross-sectional view of the conduit of FIG. 17a taken along line XVIIc—XVIIc.

FIG. 17d is a cross-sectional view of the conduit of FIG. 17a taken along line XVIId—XVIId.

FIG. 17e is a perspective view of the distorted wing of FIG. 17a shown with the conduit in a single plane.

FIG. 34 is a side view of a pair of conduits and a pair of vortex finders in cascade relationship constructed in accordance with another embodiment of the invention.

FIG. 35a is a schematic side view of a conduit showing a wake cavity constructed in accordance with another embodiment of the invention.

FIG. 39b is a partial side view of the downstream portion of the conduit of FIG. 39a.

FIG. 47 is a side view of a thermally insulated conduit of FIG. 1 shown in conjunction with an inlet flow pipe and a vortex finder.

FIG. 48a is a partial side view of a flexible downstream portion of a conduit constructed in accordance with another embodiment of the invention.

FIG. 48b is a cross-sectional view of the downstream portion of FIG. 48a taken along line XLVIII—XLVIII.

FIG. 49 is a partial side view of the downstream portion of FIG. 48a with a cutaway section showing a variably shaped and variably positioned vortex finder.

FIG. 51b is a back view of the spiral casing of FIG. 51a.

FIG. 52 is a side view of the conduit of FIG. 1 shown in conjunction with a flare stack.

FIG. 53 is a partial side view of a downstream portion of a conduit shown in conjunction with an adsorber constructed in accordance with another embodiment of the invention.

FIG. 54a is a partial side view of a conduit showing an upstream tangential separator constructed in accordance with another embodiment of the invention.

FIG. 54b is a bottom view of the tangential inlet of the conduit of FIG. 54a.

DETAILED DESCRIPTION OF PREFERRED EMBODIMENTS

Figure 3:
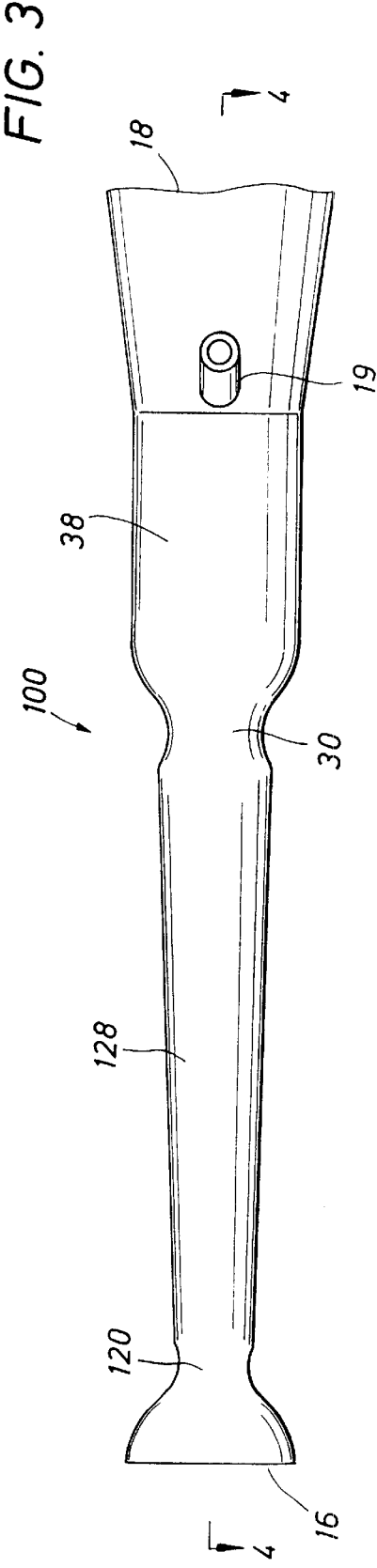
FIG. 3 is a side view of a conduit constructed in accordance with another embodiment of the invention.

Referring now to FIGS. 1–2, a conduit 10 is shown having a subsonic inlet 16, a nozzle 20, a supersonic passageway 28, a diffuser 30, a subsonic passageway 38, an outlet 18, and a separated component outlet 19. As best seen in FIG.

2, the conduit 10 is a tube having varying diameters and including a wall 12 with an internal surface 14.

The nozzle 20 functions to increase the velocity of a compressible fluid stream 50 from subsonic to supersonic velocity. The nozzle 20 includes a converging section 22, a throat 24, and a diverging section 26. The diverging section 26 leads into and is contiguous with the supersonic passageway 28. Preferably, the diameter of the throat 24 of the nozzle 20 is less than the diameter of the diffuser 30 at its smallest throughput point, i.e., at its throat. The nozzle 20 provides non-isenthalpic expansion of the fluid stream 50 and a decrease in the temperature of the fluid stream 50.

As noted above, the nozzle 20 functions to increase the velocity of an input fluid stream, here shown as a fluid stream 50, from subsonic to supersonic flow. The subsonic-transonic boundary is shown schematically by a dashed line 41. The area between the inlet 16 and the subsonic-transonic boundary 41 is the first subsonic flow region 40. The transonic-supersonic boundary is shown schematically by a dashed line 43. The area bounded between the subsonic-transonic boundary 41 and the transonic-supersonic boundary 43 is the transonic flow region 42. To the right of the transonic-supersonic boundary 43 is a supersonic flow region 44.

In one embodiment of the invention, the fluid stream 50 includes a natural gas produced from an earth formation. The term "natural gas" is applied to gas produced from underground accumulations of widely varying composition. Apart from hydrocarbons, natural gas generally includes nitrogen, carbon dioxide and sometimes a small proportion of hydrogen sulfide. The principal hydrocarbon is methane, the lightest and lowest boiling member of the paraffin series of hydrocarbons. Other constituents are ethane, propane, butane, pentane, hexane, heptane, etc. The lighter constituents, e.g., up to butane, are in gaseous phase at atmospheric temperatures and pressures. The heavier constituents arc in gaseous phase when at elevated temperatures during production from the subsurface and in liquid phase when the gas mixture has cooled down. Natural gas containing such heavier constituents is known as "wet gas" as distinct from dry gas containing none or only a small proportion of liquid hydrocarbons. Other fluid stream compositions are, of course, within the scope of the invention. For example, water in a gas, such as methane or air, may be used as the fluid stream 50. In addition, the separated component may be $CO_2$, $N_2$, $NO_x$, $H_2S$, or any other entrained component within a compressible fluid stream.

The supersonic passageway 28 leads into a deceleration zone, preferably a diffuser 30. More particularly, the supersonic passageway 28 leads into and is contiguous with a converging inlet 32 of the diffuser 30. The diffuser 30 further includes a throat 34 and a diverging outlet 36. The diffuser 30 decreases the axial velocity of a supersonic flow to subsonic velocity. Therefore, a boundary layer is created delineating the change in axial velocity of the fluid stream 50 from supersonic to subsonic flow velocity. The supersonic-subsonic velocity boundary is shown schematically by a dashed line 58. This boundary is also referred to herein as a controlled final, or normal, shock wave 58. The area of the conduit 10 bounded by the transonic-supersonic boundary 43 and the supersonic-subsonic boundary 58 is supersonic flow region 44. The area to the right of the supersonic-subsonic boundary 58 is a second subsonic flow region 48. Thus, as illustrated in FIG. 2, the fluid stream 50 enters the inlet 16 at subsonic velocity, increases to transonic velocity in the transonic flow region 42, increases in velocity to supersonic flow in the supersonic flow region 44, and decreases in velocity to subsonic flow velocity in a deceleration zone before exiting the conduit as either an output flow 56 or a separated component flow 54. It is to be understood that the various velocity boundaries 41, 43, 58 are schematically illustrated. The actual positions of these velocity boundaries 41, 43, 58 may vary depending upon a variety of factors, including inlet velocity and inlet and outlet pressure.

As noted above, one preferred embodiment of the described invention is the imparting of a tangential component to the axial velocity of the fluid stream 50. As the input fluid stream 50 enters the conduit 10 in this embodiment, its velocity is entirely or almost entirely axial. As shown in FIG. 2, a wing 60 is placed on the internal surface 14 of the wall 12. The wing 60 is preferably provided with a very sharp leading edge, which may be virtually razor-like. A sharp leading edge enables a flow at high velocity to separate at the leading edge of the wing. Separation of this flow causes a vortex to form thereby imparting a circular motion to the flow where the strength of the circular flow is proportional to the lift force acting on the wing.

The wing 60 is also relatively flat, with a thickness preferably no more than about four millimeters at the base of the wing. Although shown as a half-delta shaped wing 60, it may also be full-delta shaped, which would provide for two swirling vortices which may be advantageous for certain separation applications. The fluid stream 50 in the supersonic passageway 28 comes in contact with and flows over the wing 60. The wing 60 causes the fluid stream 50 to swirl through the remainder of the supersonic passageway 28. Specifically, the swirling fluid stream 50 initiates when it lifts off of the surface of the wing 60. The swirl of the input fluid stream 50 is shown schematically by a swirl flow 52. Given that the velocity of the swirl flow 52 in the supersonic passageway 28 is still supersonic, there remains a supersonic axial velocity. In the deceleration zone the axial velocity component of the flow diminishes, which is shown schematically by swirls which are axially closer together in the subsonic passageway 38. Where the axial velocity of the fluid stream 50 decreases and the tangential velocity remains tile same (or decreases to a smaller degree), the swirl ratio defined as $V_{tan}/V_{axial}$ increases, and the swirl is thus enhanced or enforced.

An interesting physical phenomenon has been observed regarding the flowing of the fluid stream 50 over the wing 60 within the conduit 10. In comparison with fluid flow over a wing in unconfined surroundings, the fluid stream 50 attains earlier lift-off at the leading edge of the wing 60. It has been determined that the earlier lift-off is primarily due to the confined space within the conduit 10. The significance is that at supersonic flows in enclosed environments, droplet separation improves by using wings with long cords and having a small angle of incidence for the wing 60, instead of short wings with an increased angle of incidence.

It is most preferred that the wing 60 have subsonic leading and trailing edges. A subsonic trailing edge will limit blockage or stagnation of flow. It is preferred that the angle of incidence, i.e., the angle that the wing is placed off of the longitudinal axis of the conduit, for a single wing 60 creating a single vortex flow be in the range of about two to about twenty degrees, and most preferably about ten degrees. In certain applications and for certain fluid streams, however, other angles of incidence may be acceptable. Further, it is preferred that the sweep back angle of the leading edge be high, for example, in the range of about seventy degrees or more. In addition, the greatest span (height) of the wing 60 is preferably between one-half and three-quarters of the diameter of the supersonic passageway 28, and most preferably about two-thirds that diameter. Also, it is preferred that the length of the wing 60 (the cord length) be long relative to the diameter of the conduit, for example in the range of about six conduit diameters or more. Typically, such cord lengths can only be achieved with distorted or curved wings wherein the wing span is always perpendicular to the conduit wall where the wing contacts the wall, and these are particularly preferred.

The tangential velocity (swirl) of the fluid stream 50 assists in the separation of heavier components of the fluid stream 50 from the lighter components. More particularly, the tangential velocity component of the fluid stream 50 imparts a centrifugal force upon heavier particles in the fluid stream 50 forcing them radially outwardly. Thus, heavier particles of the fluid stream 50 begin moving radially outwardly in the supersonic passageway 28 after passing over the wing 60.

Figure 24:
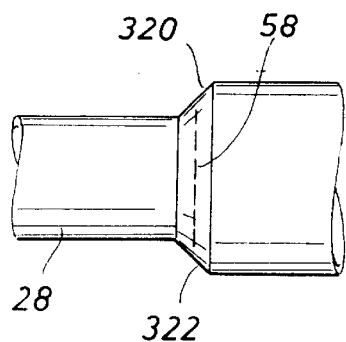
FIG. 24 is a partial side view of a subsonic diffuser constructed in accordance with another embodiment of the invention.

As mentioned above, another preferred embodiment of the invention is the creation of a controlled final shock wave 58 in the deceleration zone. When fluid flow passes from supersonic to subsonic velocity, a shock wave is created. The supersonic velocity can be reduced to subsonic by any suitable method or structure for causing a shock wave. Preferably, the shock wave 58 is a controlled, final and substantially rectangular shock wave. Preferably the shock wave is created by inducing the stream of fluid to flow through the diffuser 30. Another suitable diffuser is a supersonic diffuser 320 (FIG. 24). The shock wave 58 increases the swirl ratio, thereby facilitating the travel of the heavier particles radially outward toward the inner surface 14 of the wall 12.

As the fluid stream 50 passes into the second subsonic flow region 48, the fluid stream 50 has been generally segregated into a flow of heavier particles toward the inner surface 14 of the wall 12 and a flow of lighter components located more centrally in the conduit 10. The lighter components 56 of the fluid stream 50 exit the conduit through the outlet 18, while the condensed particles, or separated component flow 54, exits the conduit through the separated component outlet 19.

Figure 4:
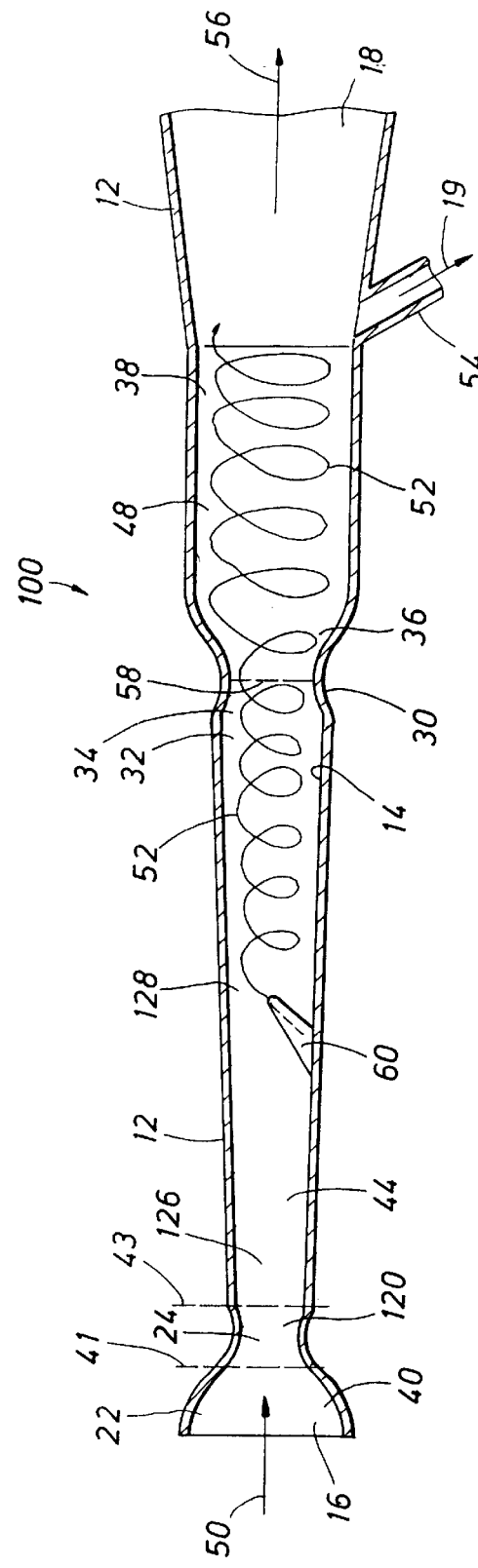
FIG. 4 is a cross-sectional view of the conduit of FIG. 3 taken along line III—III.

With reference to FIGS. 3–4, a conduit 100 is shown. The conduit 100 differs from the conduit 10 in that the supersonic passageway 28 of tie conduit 10 has a constant diameter. In the conduit 100, however, a supersonic passageway 128 has a diameter that increases between a nozzle 120 and the diffuser 30. The nozzle 120 has a diverging section 126 which is contiguous with the supersonic passageway 128. As illustrated, the wall 12 has a constant thickness and the outer diameter increases in the flow direction. Alternatively, the wall 12 may have a fixed outer diameter and a wall thickness which diminishes in the flow direction.

As the fluid stream 50 passes through the nozzle 120 and into the diverging section 126 and the supersonic passageway 128, the axial velocity increases from subsonic, through transonic, and into supersonic flow. The continually increasing diameter of the supersonic passageway 128 allows the fluid flow to continue to increase its velocity in the supersonic flow range throughout the passageway 128. This leads to greater cooling of the fluid stream 50, which has an effect, as described above with reference to FIGS. 1–2, on the creation of condensed or solidified particles and the separation of heavier components from the lighter components of the fluid stream 50.

Figure 5:
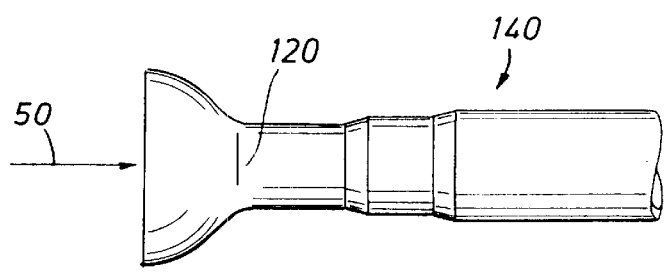
FIG. 5 is a partial side view of conduit constructed in accordance with a another embodiment of the invention.

Any suitable arrangement may be used to achieve supersonic flow in the *supersonic flow section of the apparatus of the invention. Several examples of alternative arrangements include those discussed below with reference to FIGS. 5–9. FIG. 5 shows a conduit 140 that differs from the conduits 10, 100 in that the diameter of the conduit 140 downstream of the nozzle 120 increases in a cascading fashion. Although FIG. 5 shows that the diameter of the conduit 140 expands in three locations, it is to be understood that the diameter can expand any number of times.

Figure 6A:
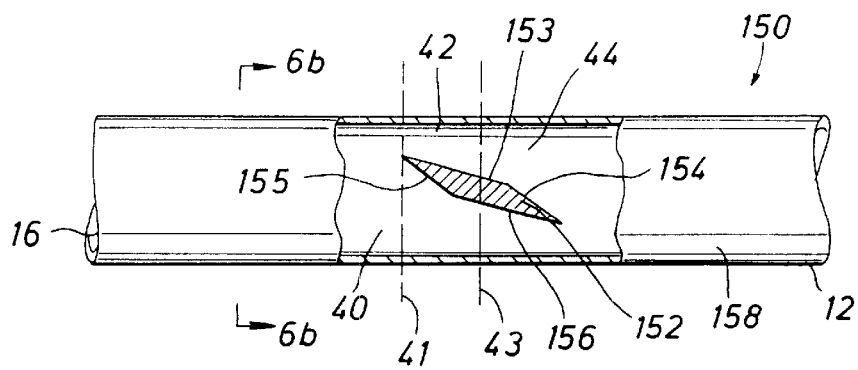
FIG. 6a is a partial side view of a conduit with a cutaway section showing an internal body to create supersonic flow.
Figure 6B:
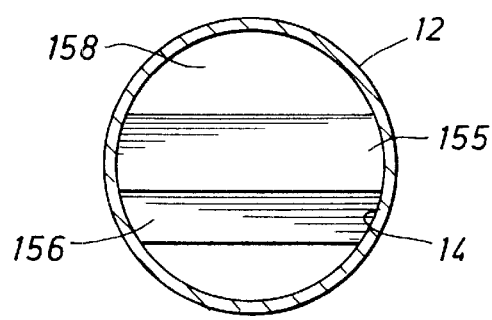
FIG. 6b is a cross-sectional view of the conduit of FIG. 5a taken along line VI—VI.

As shown in FIGS. 6a–6b, there is a conduit 150 with a constant diameter. Visible within the cutaway section of FIG. 6a, is an annular body 152. The annular body 152 is generally wing-shaped having a first and a second upper surface 153, 154 and a first and a second lower surface 155, 156. This wing type 152 extends across the diameter of the conduit 150, contacting the inner surface 14 of the wall 12. The wing type 152 induces supersonic flow through the conduit 150 such that the flow passing over the wing type 152 becomes supersonic in supersonic passageway 158.

Figure 7A:
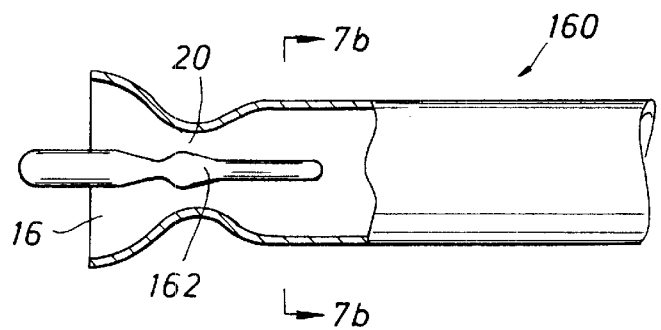
FIG. 7a is a partial side view of a conduit with a cutaway section showing an internal body in the throat to create supersonic flow.
Figure 7B:
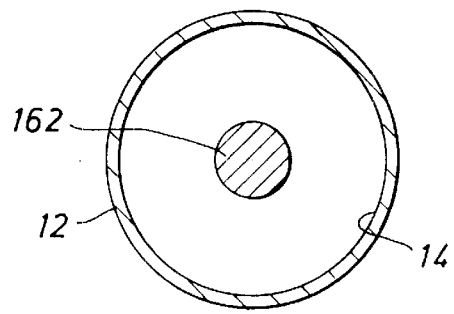
FIG. 7b is a cross-sectional view of the conduit of FIG. 7a taken along line VII—VII.

With reference to FIGS. 7a–7b, conduit 160 has an annular body 162 positioned in the inlet 16 and nozzle 20. The annular body 162 generally tapers in the direction of the fluid flow. This tapering assists in constricting the area for flow in the subsonic flow region at the inlet 16, thereby increasing the axial velocity of the fluid stream 50 as it passes into the nozzle. Further, the nozzle 20 and the annular body 162 allow for non-isenthalpic expansion of the fluid stream 50. The continued tapering of the annular body 162 beyond the nozzle 20 operates to functionally lengthen the nozzle 20 and provides a greater distance for the fluid stream 50 to travel before achieving its maximum supersonic velocity.

Figure 8:
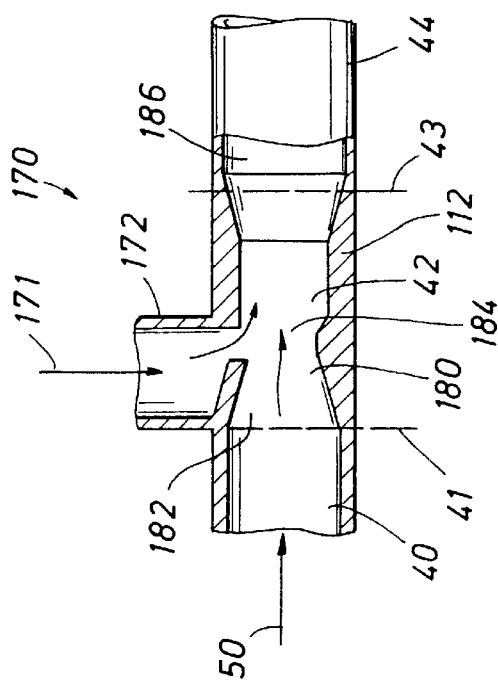
FIG. 8 is a partial cross-sectional side view of a conduit with a cutaway section showing an injector constructed in accordance with another embodiment of the invention.

FIG. 8 shows a conduit 170 with a high pressure gas inlet 172. The high pressure gas inlet 172 is positioned in the transonic flow region 42 and allows for the injection of a high pressure gas 171 into the low pressure fluid stream 50 in the transonic flow region. In addition, the thickness of the wall 112 of the conduit 170 varies from the subsonic flow region 40, through the transonic flow region 42, and into the supersonic flow region 44. A converging section 182 is positioned in the transonic flow region 42 which functions similarly to the converging section 22 of conduit 10. The converging section 182 and the wall 112 create a nozzle 180 with a throat 184. The tangential addition of the high pressure gas 171 to the low pressure fluid stream 50 alters the boundary layer at the internal surface 14 of the wall 12, which in turn affects the flow rate of the fluid stream 50 through the transonic flow region 42. The thickness of the wall 112 diminishes beyond the transonic-supersonic boundary 43 to create a diverging section 186, which allows the flow velocity of the fluid stream 50 to increase from transonic to supersonic velocity.

Figure 9:
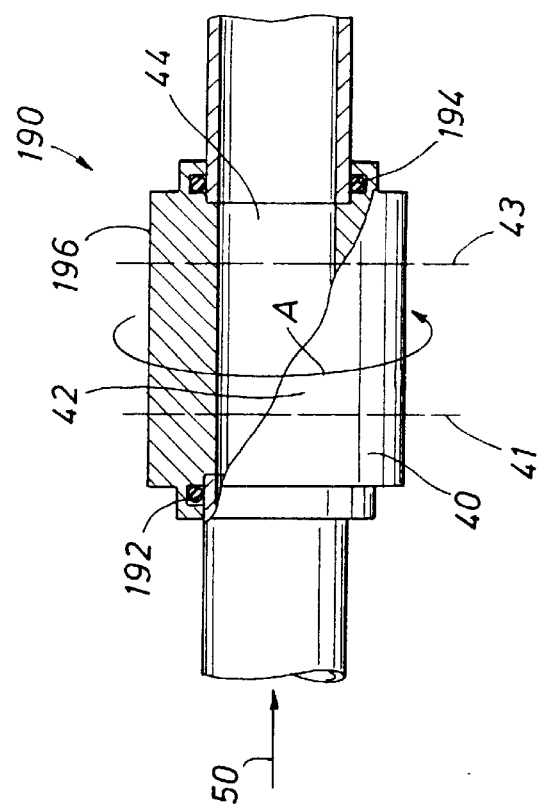
FIG. 9 is a partial side view of a conduit constructed in accordance with another embodiment of the invention.

With reference to FIG. 9, there is shown a conduit 190 constructed in accordance with an alternative embodiment of the invention. The conduit 190 includes a spinning drum 196. The spinning drum 196 is affixed to and spins a portion of the conduit 190 which is bounded by the O-rings 192, 194. The spinning drum rotates in the rotational direction A, although the opposite rotational direction would equally suffice. As the fluid stream 50 enters the conduit 190, energy is added to the fluid stream 50 by way of the rotation of the spinning drum and the spinning portion of the conduit 190, which imparts a tangential velocity to the fluid stream 50. The addition of tangential velocity to the axial velocity of the fluid stream 50 accelerates the fluid stream velocity from the subsonic into the supersonic flow region.

Figure 23:
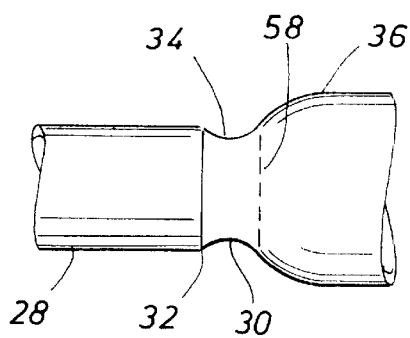
FIG. 23 is a partial side view of the supersonic diffuser of the conduit of FIG. 1.

Various axial deceleration configurations, and shock wave capturing and swirl enforcing structures may also be used, including, without limitation, those discussed below with reference to FIGS. 23–26. FIG. 23 shows a portion of the conduit 10 with a supersonic diffuser 30. The controlled final shock wave 58 occurs just after the throat 34 in the diverging part of the diffuser 30. With reference to FIG. 24, there is shown an alternative embodiment having a subsonic diffuser 320. As illustrated, the controlled final shock wave 58 occurs just after or upon the fluid stream 50 reaching a diverging outlet 322. In a subsonic diffuser, such as the diffuser 320 shown in FIG. 24, the fluid stream 50 enters the diffuser 320 at supersonic velocity and decreases in velocity to the subsonic flow region. In a supersonic diffuser, such as the diffuser 30 shown in FIGS. 1–2 or FIG. 23, the fluid stream 50 enters the converging inlet 32 at supersonic velocity, and also exits with a velocity in the subsonic flow region. However, the subsonic diffuser 320 creates a more forceful shock wave 58 than that created by the supersonic diffuser 30.

Figure 25:
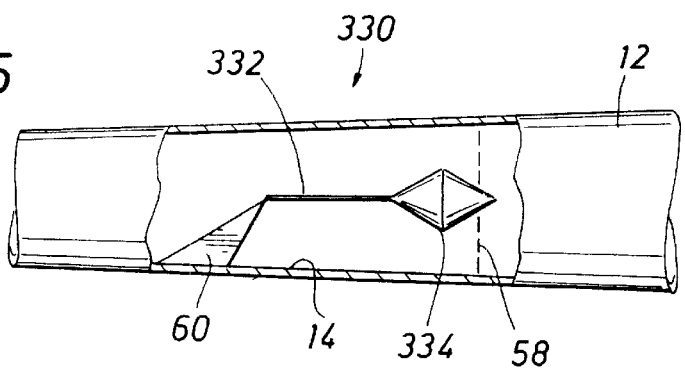
FIG. 25 is a partial side view of a conduit with a cutaway section showing a swirl enhancing body constructed in accordance with another embodiment of the invention.

With reference to FIG. 25, a conduit 330 has a wing 60 positioned on the interior surface 14 of the wall 12. An annular body 334 is connected to the wing 60 by way of a tether 332. The annular body 334 functions similarly to the throat 34 of the diffuser 30. The decrease in flow area decreases the velocity of the fluid stream 50 such that the controlled final shock wave 58 may be created.

Figure 26:
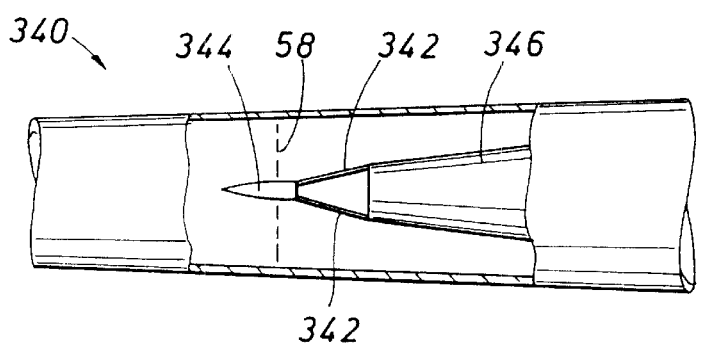
FIG. 26 is a partial side view of a diffuser portion of a conduit with a cutaway section showing a vortex finder and a swirl enhancing body constructed in accordance with another embodiment of the invention.

As shown in FIG. 26, there is a conduit 340 having an annular body 344 attached to a vortex finder 346. The annular body 344 may be attached by a plurality of tethers 342 as illustrated. The vortex finder 346 is a hollow, generally cylindrical tube of continually increasing diameter and placed in a position generally centrally within the conduit so as to capture the vortex. The annular body 344 functions similarly to the annular body 334 described with reference to FIG. 25.

Swirl Imparting Structures

Figure 14:
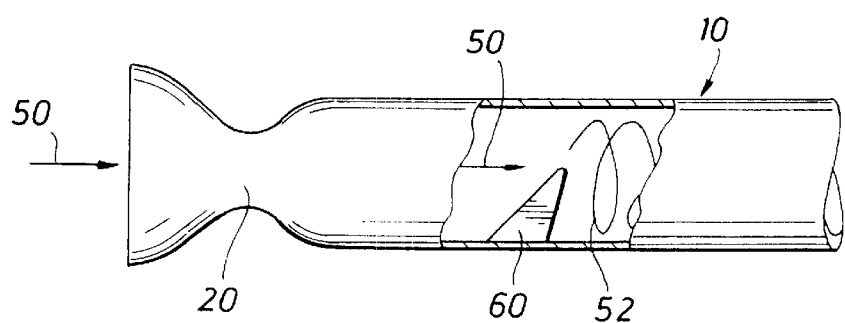
FIG. 14 is a partial side view of the conduit of FIG. 1 with a cutaway section showing a wing.

As mentioned above, one preferred embodiment of the invention involves imparting a tangential component to the axial flow of the fluid stream 50. A tangential or swirling flow provides centrifugal force to assist in the separation of heavier components from the lighter components of the fluid stream 50. One previously described structure for imparting swirl is the wing 60, shown in FIGS. 2, 14. Any suitable structure or method may be used so long as a tangential component is imparted to the axial flow of the fluid stream 50. Various particularly preferred and other alternative swirl importing structures include those discussed below with reference to FIGS. 10–22b.

Figure 59:
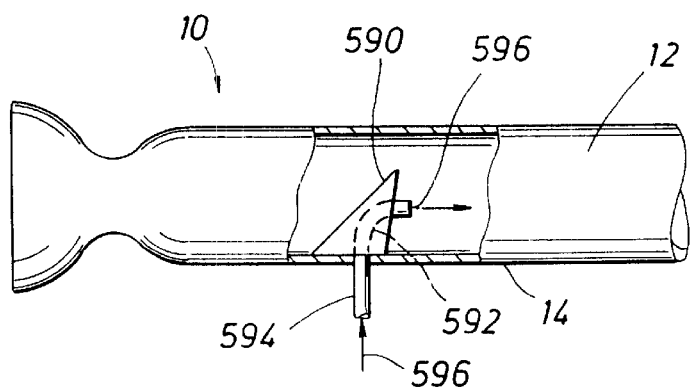
FIG. 59 is a partial side view of the conduit of FIG. 1 with a cutaway section showing a porous wing.

A wing 590 is shown in FIG. 59 on tie interior surface 14 of the wall 12. The wing 590 includes an orifice 592. The orifice 592 is connected to a gas inlet tube 594. A gas stream 596 is introduced through the inlet tube 594 and into the orifice 592. The addition of this gas 596 to the fluid stream 50 enhances the swirl flow 52.

Figure 60:
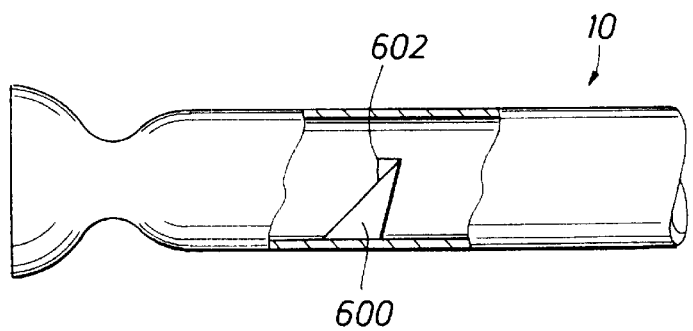
FIG. 60 is a partial side view of the conduit of FIG. 1 with a cutaway section showing a winglet.

In FIG. 60, a wing 600 is shown including a winglet 602. The fluid 5 stream 50, upon contacting and passing over the wing 600, is effected by the winglet portion 602 of the wing 600. The winglet 602 enhances the swirl flow 52 of the fluid stream 50. The use of multiple wings each having a smaller surface area than one larger wing may also enhance swirl flow.

Figure 61:
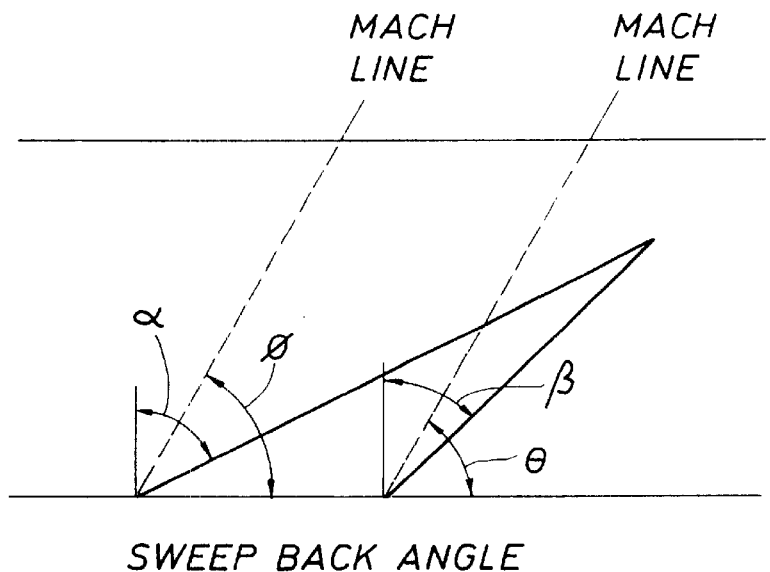
FIG. 61 is a schematic representation of a wing shown with Mach lines.

With reference to FIG. 61, a particularly preferred subsonic delta wing is shown with a pair of Mach lines. The sweep back angle a of the leading edge of the wing (measured from the vertical) plus the Mach angle ϕ (measured from the horizontal) is greater than ninety degrees, denoting that the leading edge of the wing is subsonic. In addition, the trailing edge angle β of the wing plus the Mach angle θ also is greater than ninety degrees, denoting that the trailing edge wing is also subsonic. Wings with subsonic leading and subsonic trailing edges provide enhanced swirl and reduced blockage in confined conduit flow and so are particularly wellsuited to the apparatus and method of the present invention.

Figure 10:
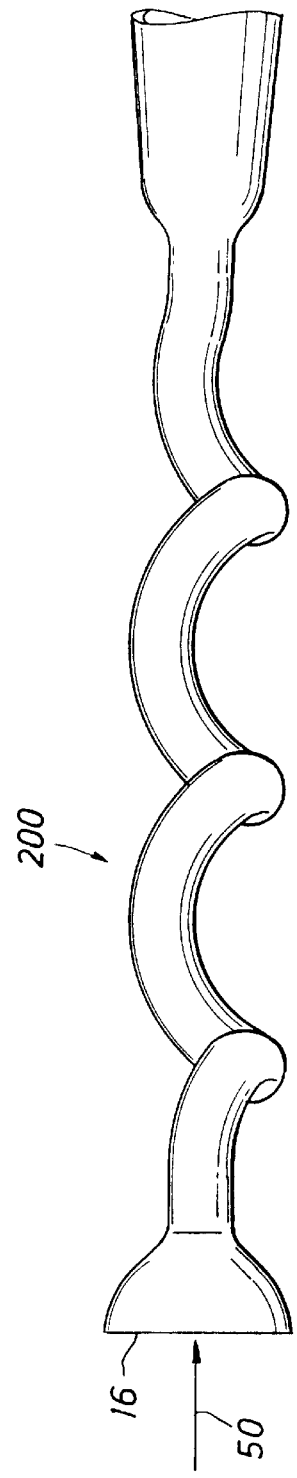
FIG. 10 is a side view of a helical shaped conduit constructed in accordance with another embodiment of the invention.

As shown in FIG. 10, conduit 200 is helical in shape. This helical shape imparts a tangential component to the axial velocity of the fluid stream 50 after it enters the inlet 16. With reference to FIG. 11, conduit 210 includes a helical annular body 212 positioned within the interior of the conduit 210. As the fluid stream 50 passes into the conduit 210 and comes in contact with the annular body 212, the annular body 212 adds a tangential component to the axial velocity, thereby creating the swirl flow 52. With reference to FIGS. 12a–12b, there is shown a conduit 220 having a plurality of indentations or asymmetrical portions along a wall 224. The indentations 222 impart a tangential component to the fluid stream 50.

With reference to FIGS. 13a–13d, a conduit 230 is shown having various different cross-sectional shapes. More particularly, and as shown in FIG. 13b, the conduit 230 may include a triangular conduit portion 232. Further, as shown in FIG. 13c, the conduit 230 may include an elliptical conduit portion 234. Also, with reference to FIG. 13d, the conduit 230 may include a rectangular conduit portion 236. Though not illustrated, other cross-sections, such as square shapes, may be utilized. The combination of various cross-sectional shapes alters the flow area through which the fluid stream 50 travels and impaits one or more tangential components to the fluid stream 50.

Figure 15A:
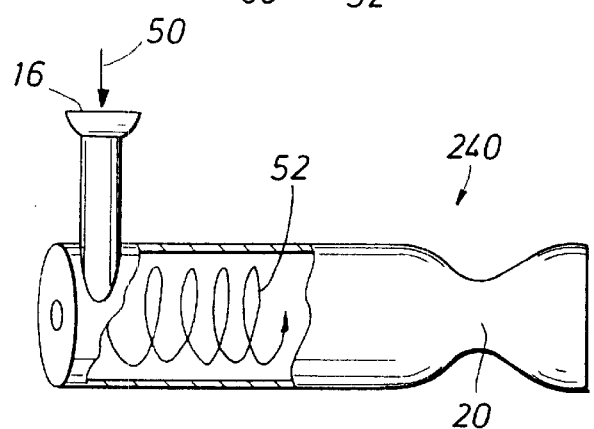
FIG. 15a is a partial side view of a conduit constructed in accordance with another embodiment of the invention.
Figure 15B:
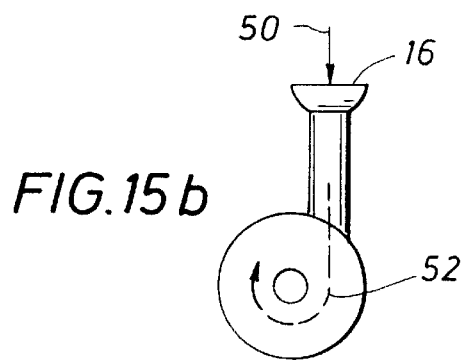

As shown in FIGS. 15a–15b, there is a conduit 240 in which the inlet 16 for the fluid stream 50 is provided tangential to the longitudinal axis of the conduit 240. This tangential entry of the fluid stream 50 creates swirl flow 52 upon entry into the flow area within the conduit 240.

Figure 16:
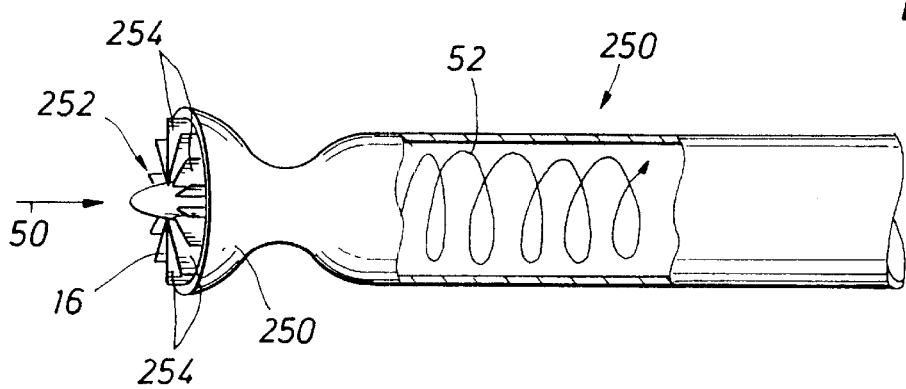
FIG. 16 is a partial side view of a conduit containing a stator wheel at the inlet constructed in accordance with another embodiment of the invention.

With reference to FIG. 16, a conduit 250 includes a stator wheel 252 having a plurality of blades 254 placed upstream of the nozzle 20 and within the inlet 16. Passing the fluid stream 50 through the stator wheel 252 creates swirl flow 52. The swirl flow 52 may thus begin in the subsonic flow region 40 of the conduit 250 and then become supersonic.

With reference to FIGS. 17a–17e, a conduit 260 has a distorted or curved wing 262 positioned on the internal surface 14. The distorted wing 262 includes a wing body 264 having a base portion;265. The distorted wing 262 wraps around a portion of the interior of the conduit 260 such that the base portion, 65 is in contact with and continually at a ninety degree (90°) angle to the interior surface 14 of the wall 12. FIG. 17a shows the line of the wing base 265 where it contacts the interior wall surface 14.

In the direction of the fluid flow, the distorted wing 262 has a first end 266 having a height H1 and a second end 267 having a second height H2. Preferably, the second height H2 is about one and a half times the radius of the supersonic passageway 28. Between the first and second ends 266, 267, the distorted wing 262 gradually increases in height from Hi to H2. Since the distorted wing 262 wraps around the interior surface 14 at a ninety degree (90°) angle at its base portion 264, a view from the inlet 16 of the conduit 260 shows the leading edge of the wing 262 spiraling inwardly from the first end 266 to the second end 267 (FIG. 17b). As the fluid stream 50 enters the conduit 260 and comes in contact with the distorted wing 262, a portion of the axial velocity of the fluid stream 50 is transformed into tangential velocity to create swirl flow 52. In another embodiment (not shown), a distorted wing effect is provided by a series of non-distorted wings, each being shorter in cord length and each being axially offset from the wings on the upstream and downstream side of the series. Alternatively, instead of using a single distorted wing 262, a similar result may be obtained from positioning several smaller, overlapping wings (not shown) wrapping around the interior surface 14 of the wall 12.

Figure 64A:
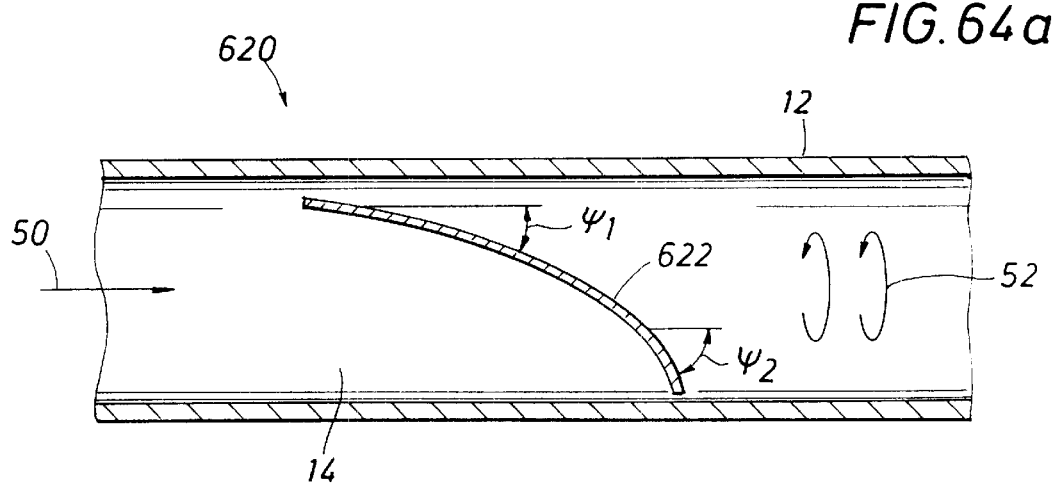
FIG. 64a is a cross sectional top view of a conduit with a cutaway section showing a cambered wing constructed in accordance with another embodiment of the invention.
Figure 64B:
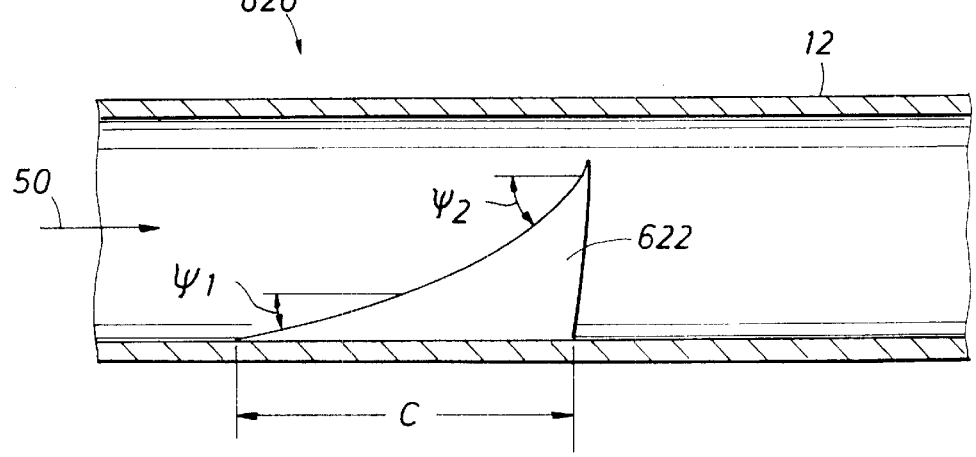
FIG. 64b is a cross sectional side view of the cambered wing of FIG. 64a shown in a single plane.

With reference to FIGS. 64a–64b, a conduit 620 has a cambered wing 622 positioned on the internal surface 14. The cambered wing 622 wraps around a portion of the interior of the conduit 620 such that the base portion is in contact with and continually at a ninety degree (90°) angle to the interior surface 14 of the wall 12. In the direction of the fluid flow 50, the cambered wing 622 has an increasing or decreasing angle of incidence $\psi$. The change in the angle of incidence divided by the change in the cord line ($d\psi/dc$) is not a constant, as would be true with a flat wing. For example, the wing shown in the figure has a greater angle of incidence $\psi_2$ at a point taken near the end of the wing that the angle of incidence $\psi_1$ taken near the front of the cambered wing 622. As the fluid stream 50 enters the conduit 620 and comes in contact with the cambered wing 622, a portion of the axial velocity of the fluid stream 50 is transformed into tangential velocity to create swirl flow 52 and the swirl flow 52 is increased as the fluid passes over cambered wing 622 having an increasing angle of incidence $\psi$.

Figure 18A:
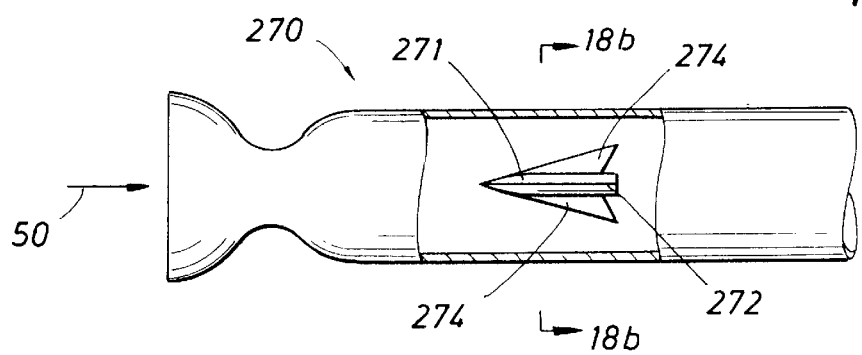
FIG. 18a is a partial side view of a conduit with a cutaway section showing a baffle with blades constructed in accordance with another embodiment of the Invention.
Figure 18B:
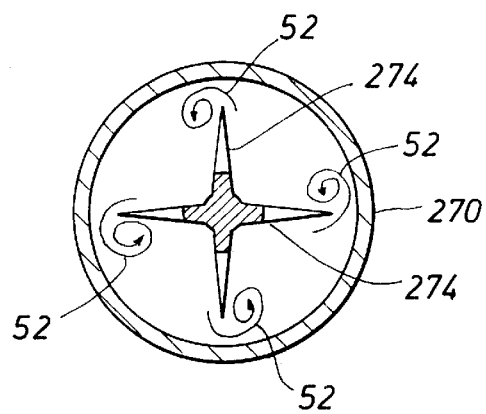
FIG. 18b is a cross-sectional view of the conduit of FIG. 18a taken along line XVIII—XVIII.

With reference to FIGS. 18a–18b, there is shown a conduit 270 including a baffle 271. The baffle 271 includes a core 272 and a plurality of blades 274. Although four blades 274 are illustrated, the baffle 271 may have any number of blades 274. With specific reference to FIG. 18b, as the fluid stream 50 comes in contact with and passes over the baffle 271, a plurality of swirl flows 52 are created around the blades 274. These swirl flows 52 may be allowed to coalesce into the singular swirl flow 52, or instead, may be utilized as distinct swirl flows 52.

Figure 19:
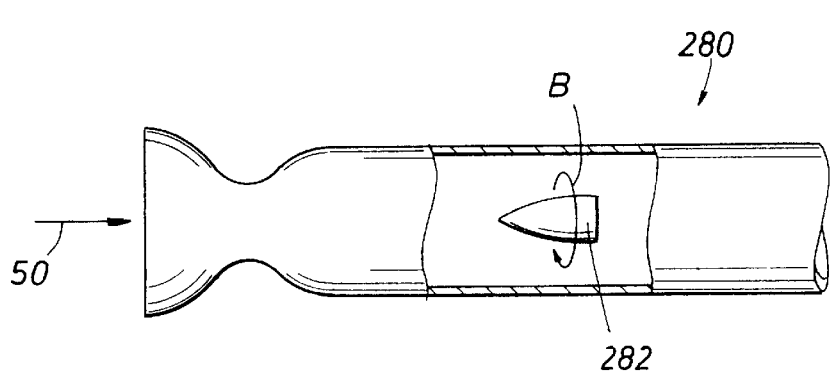
FIG. 19 is a partial side view of a conduit with a cutaway section showing a rotating annular body constructed in accordance with another embodiment of the present invention.

As shown in FIG. 19, there is a conduit 280 including an annular body 282 which rotates in the direction B. The opposite rotational direction will also suffice. The rotation of the annular body 282 within tie conduit 280 creates a Magnus effect. Thus, as the fluid stream 50 passes over the rotating annular body 282, a tangential flow component is imparted to the fluid stream 50.

Figure 20:
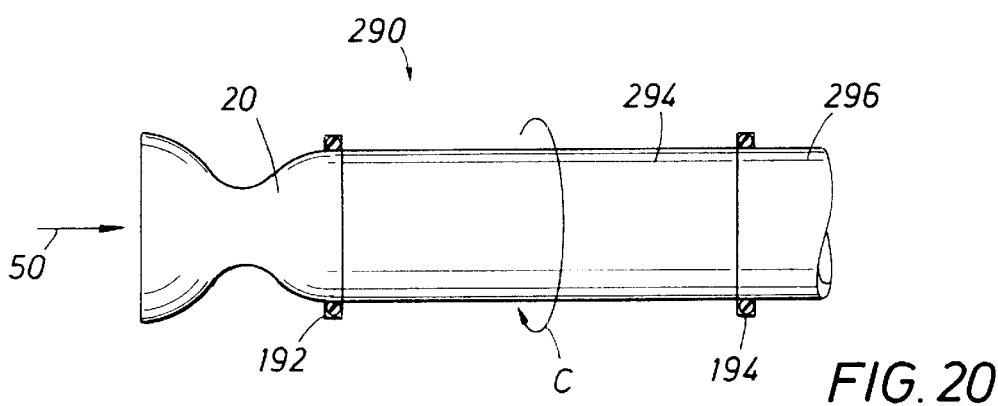
FIG. 20 is a partial side view of a rotating conduit constructed in accordance with another embodiment of the invention.

With reference to FIG. 20, a conduit 290 includes a rotating section 294 and bounded between the O-rings 192, 194. The rotating section 294 rotates in the rotational direction C, but may instead rotate in the opposite direction. The rotating section 294 imparts a tangential component to the fluid stream 50 such that the fluid stream 50 becomes the swirl flow 52.

Figure 21A:
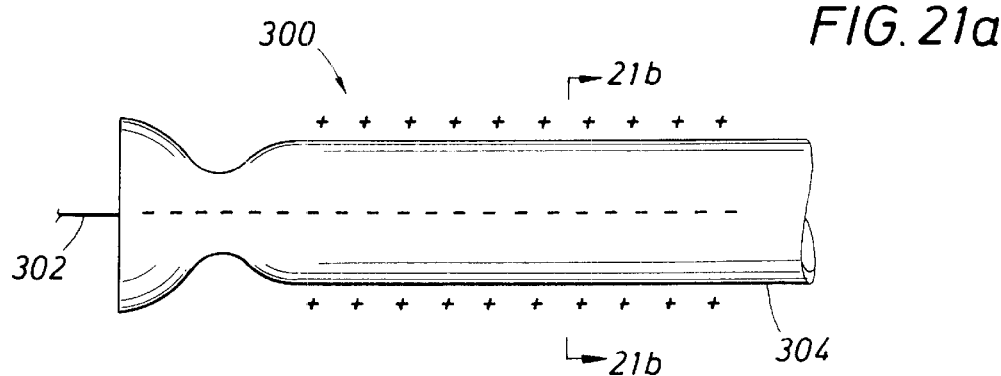
FIG. 21a is a partial side view of a conduit constructed in accordance with another embodiment of the invention.
Figure 21B:
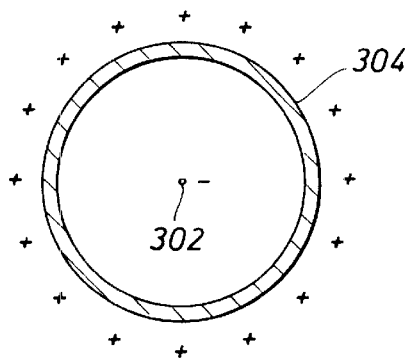
FIG. 21b is a cross-sectional view of the conduit of FIG. 21a taken along line XXI—XXI.

With reference to FIGS. 21a–21b, a conduit 300 has a charged wire 302 along its longitudinal axis and a charged wall 304. The charged wire 302 and the charged wall 304 have opposite charges. As shown, the charged wire 302 is negatively charged and the charged wall 304 is positively charged. The charged wire and wall 302, 304 may be used in conjunction with any swirl imparting structure to enhance the separation efficiency.

Figure 22A:
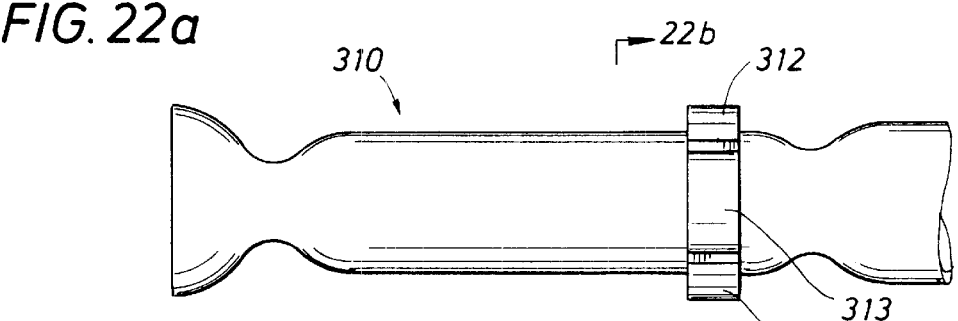
FIG. 22a is a partial side view of a conduit constructed in accordance with another embodiment of the invention.
Figure 22B:
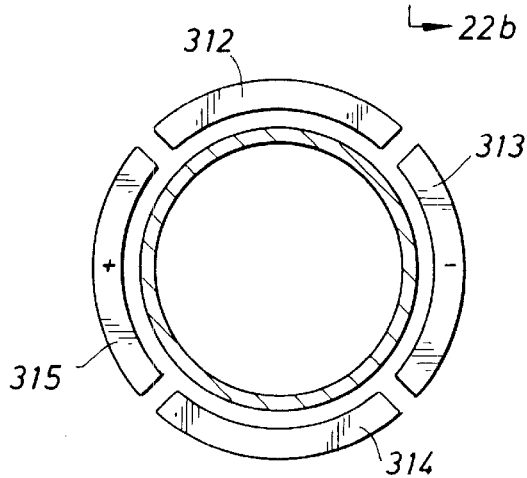
FIG. 22b is a cross-sectional view of the conduit of FIG. 22a taken along line XXII—XXII.

As shown in FIGS. 22a–22b, there is a conduit 310 having a plurality of magnets. Specifically, a magnet north 312 is positioned radially opposite to a magnet south 314. Positioned between the magnets 312, 314 and radially opposite one another are an anode 313 and a cathode 315. As with conduit 300, described and shown in FIGS. 21a–21b, the use of magnets with a conduit 310 may also be used in conjunction with any swirl imparting structure to enhance the separation efficiency.

Extracting Particles and Optimizing Drainage

As noted above, preferred embodiments of the invention include structures for the extraction of particles from the fluid stream 50. Various different arrangements and structures may be utilized for extracting particles, including, but not limited to those structures discussed below with reference to FIGS. 27–35b.

Figure 27:
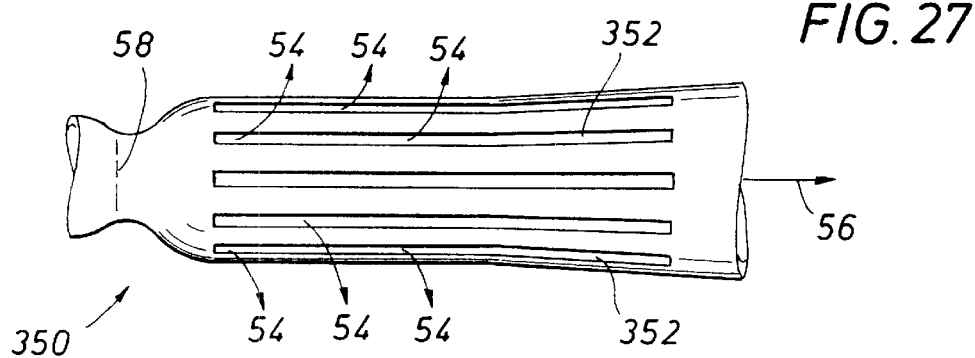
FIG. 27 is a partial side view of a downstream portion of a conduit showing longitudinal slits constructed in accordance with another embodiment of the invention.
Figure 28:
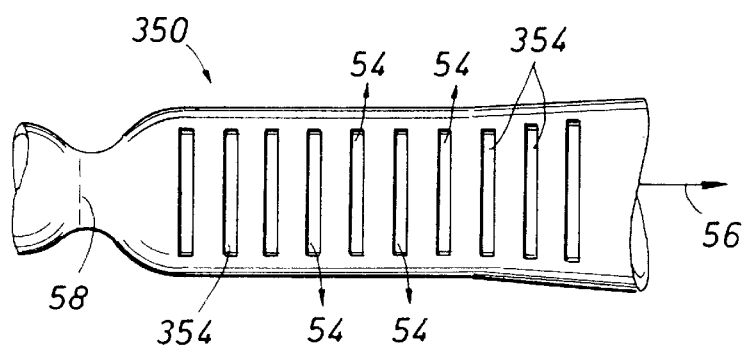
FIG. 28 is a partial side view of the downstream portion of the conduit of FIG. 27 showing circumferential slits.

As shown in FIGS. 27–28, there is a conduit 350 having either longitudinal slits 352 (FIG. 27) or circumferential slits 354 (FIG. 28) in an extraction or collection zone downstream of the diffuser 30. In this downstream portion of the conduit 350, the velocity of the fluid stream 50 has decelerated to subsonic velocity and all or a majority of the heavier particles have moved radially outward. The heavier particles or droplets 54 may then exit through the plurality of slits 352, 354 while the lighter elements continue to flow axially as depicted by tie output flow 56.

Figure 29:
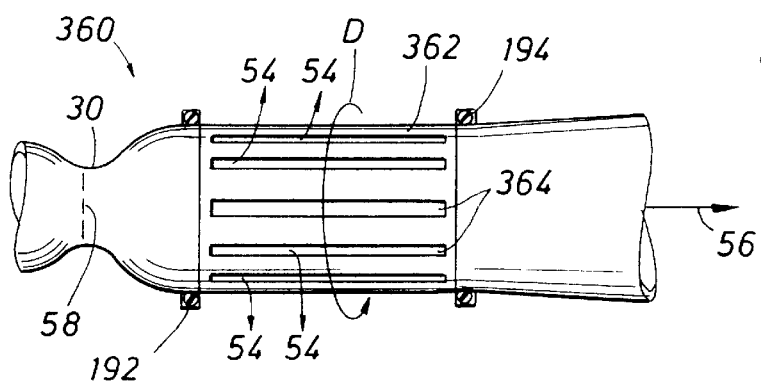
FIG. 29 is a partial side view of a downstream portion of a conduit showing a rotating drum constructed in accordance with another embodiment of the invention.

A conduit 360 including a rotating section 362 in the downstream portion and bounded by the pair of O-rings 192, 194 is shown in FIG. 29. The rotating section 362 rotates in the rotational direction D, although the opposite of the rotational direction D will also suffice depending upon the particular application. The rotating section 362 includes longitudinally directed slits 364. The heavier particles are forced radially outwardly by the added centrifugal force of the rotating section 362 and thus may more readily pass through the slits 364 and be extracted with a minimum of slip gas passing through slits 364.

Figure 30A:
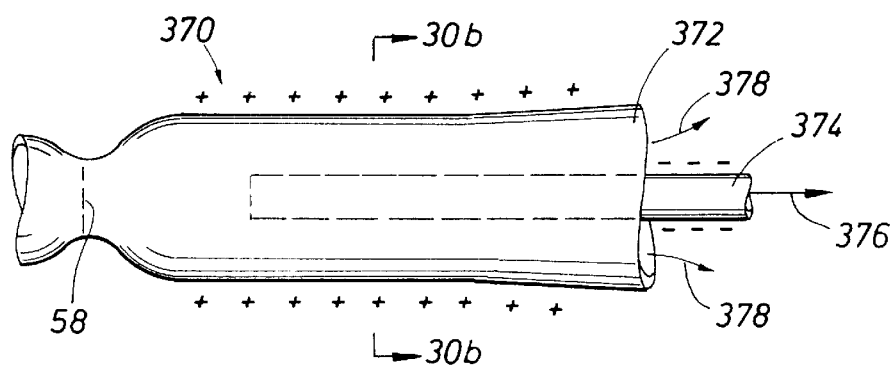
FIG. 30a is a partial side view of a downstream portion of a conduit constructed in accordance with another embodiment of the invention.
Figure 30B:
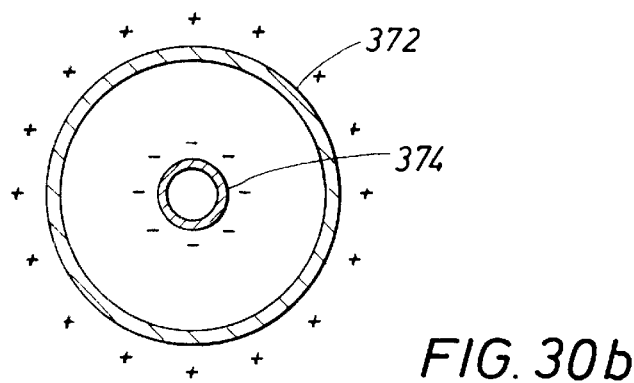
FIG. 30b is a cross-sectional view of the downstream portion of the conduit of FIG. 30a taken along line XXX—XXX.

With reference to FIGS. 30a–30b, a conduit 370 includes a charged outer wall 372 and a charged inner collection tube 374. The outer wall 372 and the collection tube 374 are each charged oppositely. For example, as illustrated, the outer wall 372 and concentrated in an outer stream 379 is positively charged while the collection tube 374 is negatively charged. Certain constituent components of the fluid stream 50 will be attracted to the charged outer wall 372 while other constituent components of the fluid stream 50 will be attracted to the charged collection tube 374. For example, as illustrated in the figure, the positively charged particles in the fluid stream 50 will be attracted to the negatively charged collection tube 374 and concentrated in an inner stream 378.

Figure 31:
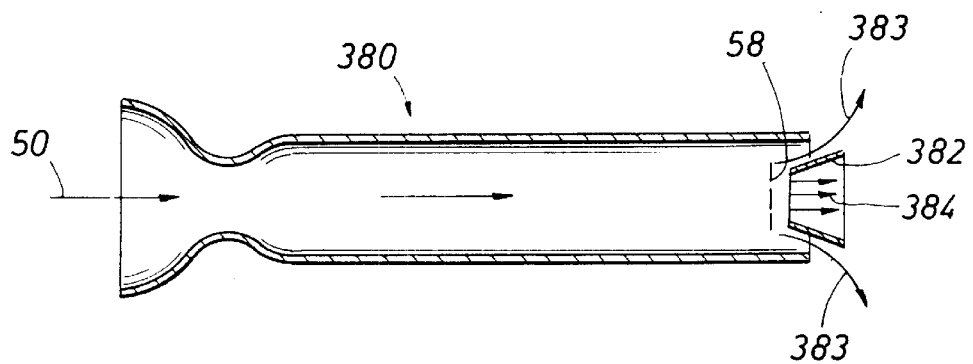
FIG. 31 is a schematic side view of a conduit and an impactor constructed in accordance with another embodiment of the invention.
Figure 32:
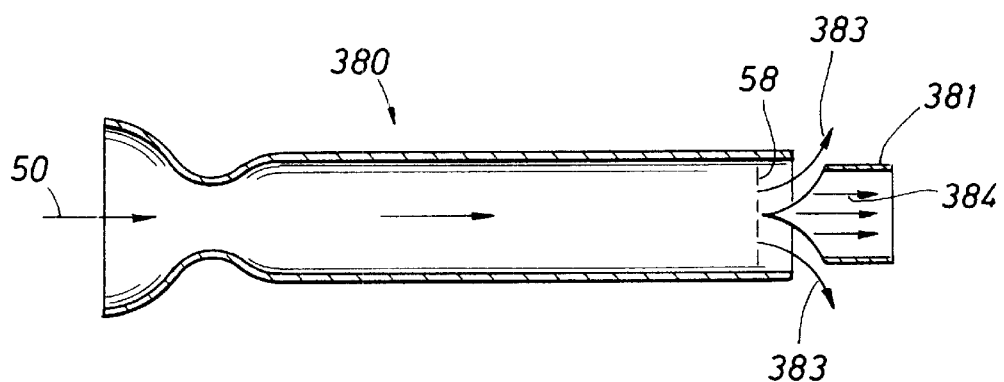
FIG. 32 is a schematic side view of the conduit of FIG. 31 showing a wedge-shaped impactor.
Figure 33:
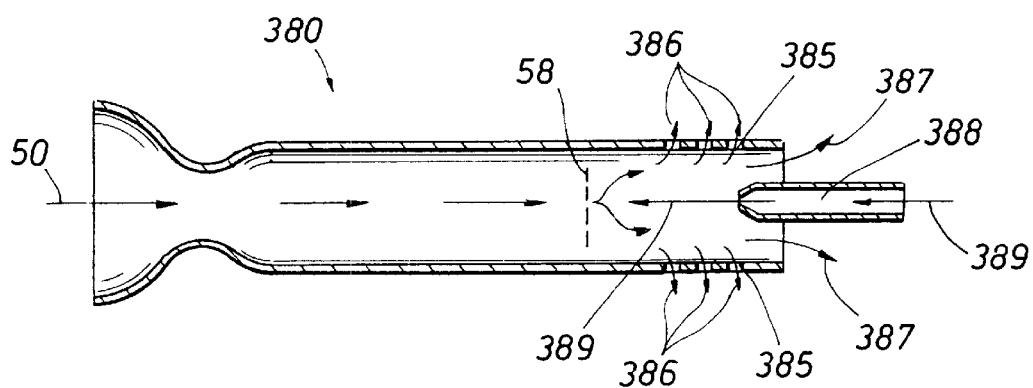
FIG. 33 is a schematic side view of the conduit of FIG. 31 showing a gas injection impactor.
Figure 35B:
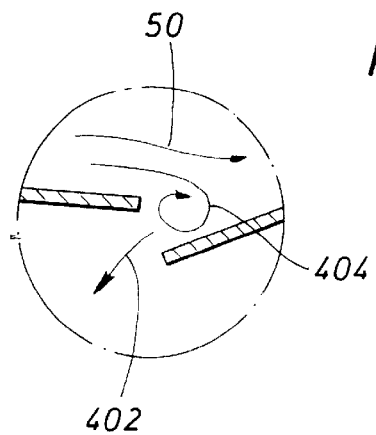
FIG. 35b is an expanded view of the conduit of FIG. 35a within circle XXXV.
Figure 36:
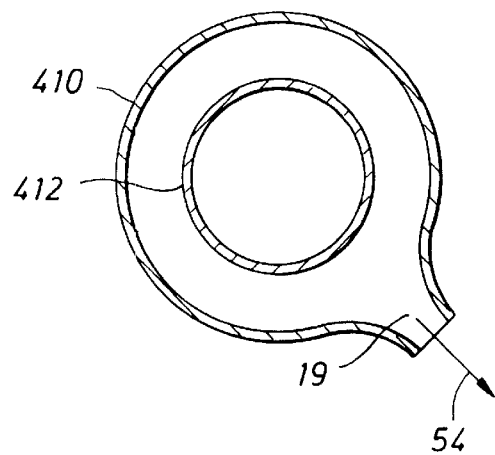
FIG. 36 is a cross-sectional view of a diffuser portion and a vortex finder of a conduit constructed in accordance with another embodiment of the invention.
Figure 37:
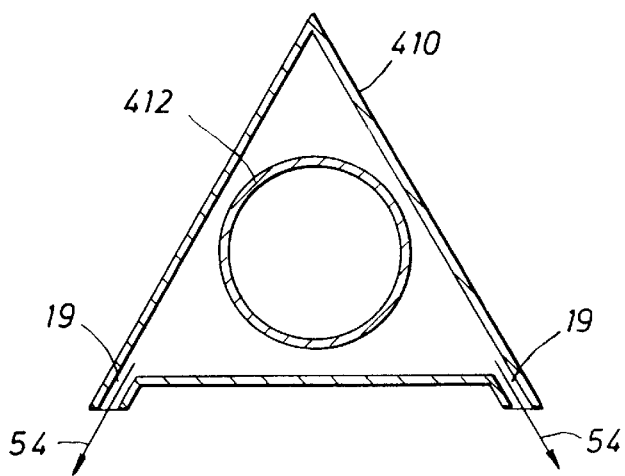
FIG. 37 is a cross-sectional view of the diffuser and vortex finder of FIG. 36, the diffuser shown in triangular shape.
Figure 38:
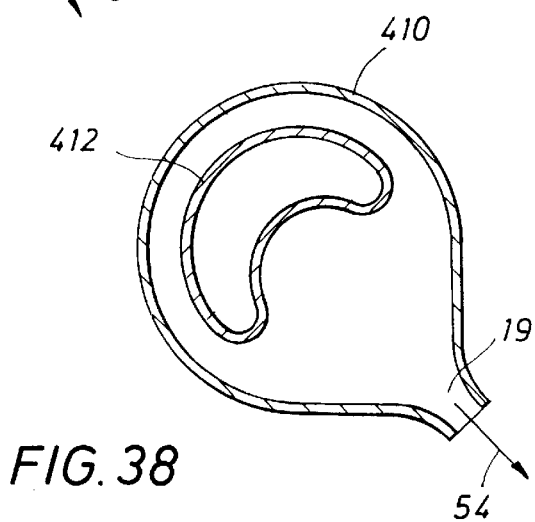
FIG. 38 is a cross-sectional view of the diffuser and vortex finder of FIG. 36, both shown in non-axi symmetric shape.
Figure 39A:
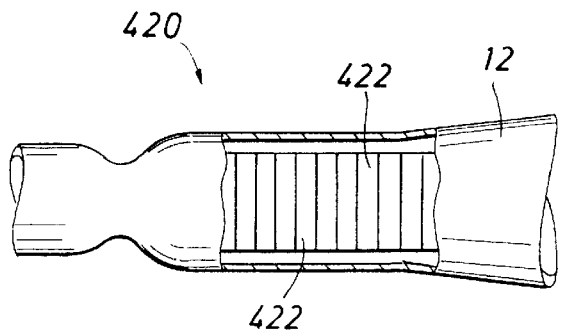
FIG. 39a is a partial top view of a downstream portion of a conduit with a cutaway section showing a conveyor belt constructed in accordance with another embodiment of the invention.
Figure 39B:
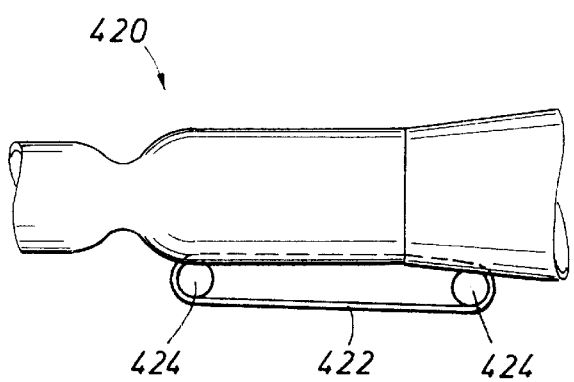
Figure 40A:
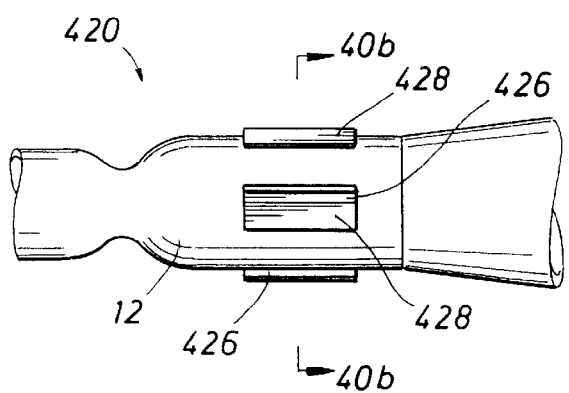
FIG. 40a is a partial side view of the downstream portion of the conduit of FIG. 39a showing another embodiment of a mechanical conveyor.
Figures 40B, 40C:
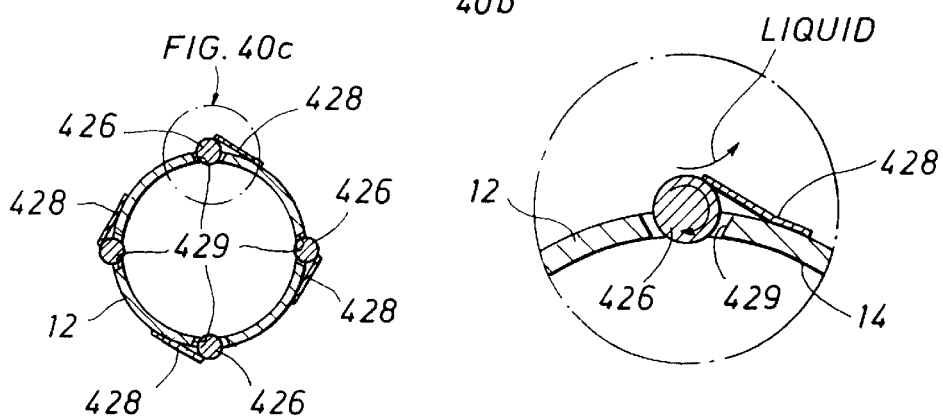
FIG. 40b is a cross-sectional view of the downstream portion of the conduit of FIG. 40a taken along line XLa—XLa.
FIG. 40c is an exploded view of the mechanical conveyor or FIG. 40b within circle XLb.
Figure 41:
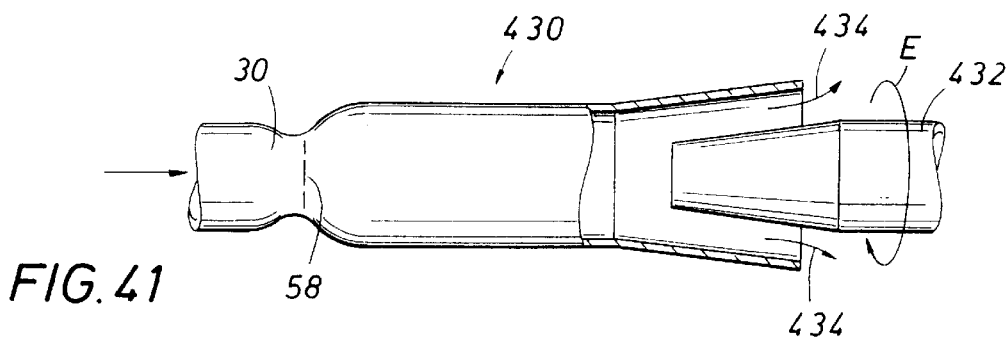
FIG. 41 is a partial side view of a downstream portion of a conduit showing a rotating vortex finder constructed in accordance with another embodiment of the invention.
Figure 42:
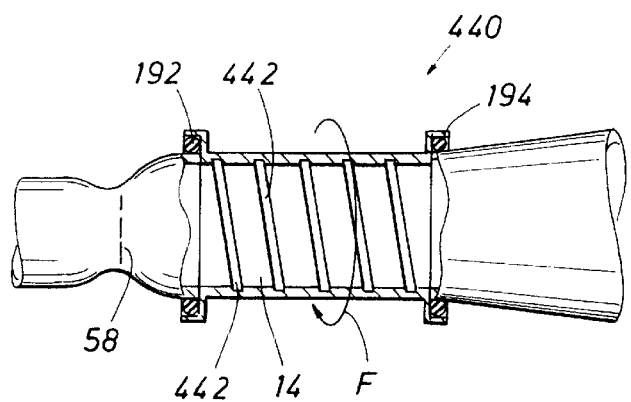
FIG. 42 is a partial side view of a downstream portion of a conduit with a cutaway section showing rotating spiral grooves constructed in accordance with another embodiment of the invention.

The conduit 380 as shown in FIGS. 31–33 differs from previously described conduits in that instead of a vortex finder, it utilizes one of several impactors. Impactors function to enlarge droplet size, and thereby increase the settling speed, by stimulating coalescence of particles. With specific reference to FIG. 31, an impactor 382 is generally frusticonical in shape with a permeable, membranous boundary layer utilizing capillary force to allow an inner output stream 384 to travel from the conduit 380. The presence of the impactor 382 within the conduit 380 assists in decreasing the velocity of the fluid stream 50 to subsonic flow, thereby creating the controlled final shock wave 58. This shock wave 58 along with any of the swirl flow 52 will assist in separating out heavier (or liquid) constituents of the fluid stream 50 such that they may flow out in an output stream 383.

A wedge shaped impactor 381 is shown in FIG. 32. The impactor 381 works similarly to the impactor 382. Specifically, the presence of the impactor 381 assists in the creation of the controlled final shock wave 58, which itself and in conjunction with any swirl flow 52 assists in separating out heavier constituents from the fluid stream 50 such that the heavier constituents may flow out through the output stream 383 and the lighter constituents may flow through the impactor 381 in the inner output stream 384.

The conduit 380 shown in FIG. 33 has a gas injection impactor 388. The conduit 380 also includes a plurality of slits 385. A fluid 389 is injected through the gas injection impactor 388 in a direction opposite the direction of the fluid stream 50. The contact of the gas stream 389 with the fluid stream 50 assists in decreasing the velocity of the fluid stream to below supersonic, thereby creating the controlled final shock wave 58 at a distance from the slits 385 and the gas injection impactor 388. The shock wave 58 in conjunction with any swirl flow 52 assists to separate the heavier particles radially outwardly such that they may flow out the slits 385 in a first output stream 386. The lighter constituents of the fluid stream 50 continue on and exit the conduit 380 in a second output stream 387.

Instead of using an impactor for enlarging droplet size and increasing settling speed, shock waves may be induced by shock wave imparting structures or acoustic sources, either of which may cause static pressure and density discontinuities. These pressure and density discontinuities lead to the formation of velocity gradients. A further mechanism, for enlarging droplet size and increasing settling speed is to add a substance to increase the surface tension of the growing particles. Various suitable hydrophobic and hydrophilic substances may be chosen by one of ordinary skill in the art given the nature of the component to be separated and the teachings provided herein.

A pair of conduits 390, 395 are shown in FIG. 34 in cascade relationship. The conduit 390 includes a cascade tube 394 which leads to the second conduit 395. Due to the swirl flow 52 and the controlled final shock wave 58 in the conduit 390, the fluid stream 50 is separated into heavier and lighter component flows, with the lighter component flowing into the first vortex finder 392 in a first gas output stream 391 and the heavier component flow flowing into the cascade tube 394 as a first condensed output stream 393. The second conduit 395 includes a second vortex finder 396 which joins with the first vortex finder 392 by way of a connector 398. The first condensed output stream 393 exits the conduit 390 at subsonic velocity and is accelerated through a nozzle 20 into the supersonic flow region. The combination of any swirl flow 52 and the controlled final shock wave 58 positioned near the second vortex finder 396 assist separation of the heavier particles from the lighter particles in the first condensed output stream 393. The heavier particles continue radially outward through the conduit 395, exiting the conduit 395 as a second condensed output stream 399. The lighter components of the first condensed output stream 393 enter the second vortex finder 396 as a second gas output stream 397, which joins with the first gas output stream 391 in the first vortex finder 392. Although, two conduits 390, 395 are shown in a cascade relationship, any number of conduits may be placed in cascade relationship in order to further increase separation efficiency.

As shown in FIGS. 35*a*–35*b*, a conduit 400, which is similar in shape to the increasing diameter conduit 100 illustrated in FIGS. 3–4, includes a plurality of wake cavities 406 on the wall 12 of the conduit 400. These wake cavities 406 create a flow discontinuity along the boundary areas of the conduit 400. Further, the wake cavities 406 assist in decreasing the velocity of the fluid stream 50 to subsonic levels, thereby creating the controlled final shock wave 58. The combination of any swirl flow 52 and the shock wave 58 facilitates travel of the heavier particles radially outward into the wake cavities 406, such that liquid particles and other heavier constituent components of the fluid stream 50 may exit the conduit 400 through the wake cavities 406 as a condensed stream 402. Just prior to exiting the wake cavities 406, the condensed stream 402 of the fluid stream 50 may rotate within eddy vortices 404. Such eddy vortices 404 will further decrease the axial velocity component of the condensed stream 402, allowing the condensed stream 402 to exit the wake cavities 406. The remaining flow of the fluid stream 50, which includes mainly lighter constituent components, continues through the conduit 400 and exits as the output flow 56.

Proper drainage of the heavier components and liquid phases of a fluid stream is important for a variety of reasons, including preventing the buildup of such components within a pipeline which would inhibit flow in the pipeline. Various preferred and alternative apparatus and methods for enhancing the drainage performance are illustrated in FIGS. 36–42. For example, FIG. 36 shows a conduit 410, generally circular in cross-section, enclosing a generally circular vortex finder 412. The separated component outlet 19 is also illustrated and the separated component flow 54 will drain from the conduit at that location. In FIG. 37, the conduit 410 is triangularly shaped and has a pair of separated component outlets 19 at its base. In FIG. 38, the conduit 410) is non-axi symmetric, and it encases a kidney shaped vortex finder 412.

As shown in FIGS. 39*a*–39*b*, a conduit 420 includes a conveyor belt 422 which is rotated around a pair of rotating pins 424. The conveyor belt 422 and pins 424 are positioned at a lower extent of the conduit 420. Conveyor belt 422 functions as a portion of the wall 12 of the conduit 420. The positioning of the conveyor belt 422 below the conduit 420 uses the effect of gravity on the heavier particle components of the fluid stream 50. Upon seedling on the conveyor belt 422, the condensed heavier particles are removed from the conduit 420 through the rotation of the conveyor belt 422 around the rotating pins 424.

An alternative drainage embodiment is illustrated in FIGS. 40*a*–40*c*. As shown in FIG. 40*b*, a plurality of rotating pins 426 are positioned on the wall 12 of the conduit 420. The rotating pins 426 are each positioned above a condensed flow outlet 429. Co-located with each rotating pin 426 in a contacting.relationship is a scraper 428. The rotation of the rotating pins 426 assists the drainage of the heavier constituent components from the conduit 420. These heavier constituent components travel around the exterior surface of the rotating pins 426 and meet with and are scraped off by the scrapers 428.

A conduit 430, including a vortex finder 432, is shown in FIG. 41. The vortex finder 432 is rotatable in the rotation direction E, although the opposite direction will equally suffice. The shock wave 58 from diffuser 30 in combination with any swirl flow 52 assists to push the heavier particulates radially outward. The rotation of the vortex finder 432 creates a suction force, pulling the lighter constituent components through the vortex finder 432 and allowing the heavier components to exit the conduit 430 as a condensed output stream 434.

In FIG. 42, there is shown a conduit 440 including spiral grooves 442 positioned along the interior surface 14 of the wall 12 within a rotating section of the conduit bounded by the pair of O-rings 192, 194. The rotating section may rotate in either the rotational direction F or the opposite rotational direction. The combination of the shock wave 58 and any swirl flow 52 assists in forcing heavier constituents radially outward in the conduit 440. The rotating section and the spiral grooves 442 further assist in forcing outwardly and draining the heavier constituent components of the fluid stream 50.

Thermal Considerations, Controllability and Pressure Recovery

Figure 43:
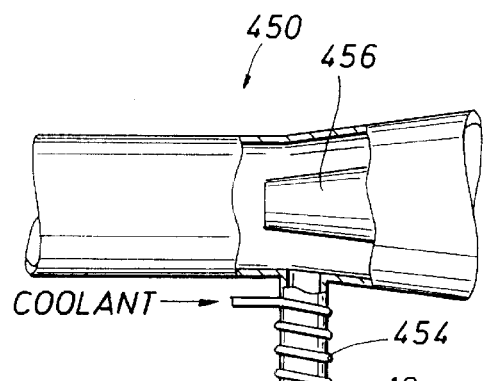
FIG. 43 is a partial side view of a downstream portion of a conduit with a cutaway section showing a vortex finder and cooling coils constructed in accordance with another embodiment of the invention.

FIG. 43 shows conduit 450 including a vortex finder 456 as well as the separated component outlet 19. Conduit 450 also includes cooling coils 454 wrapped around the separated component outlet 19. A coolant is introduced into the cooling coils to decrease the temperature of the separated component flow 54 traveling through the separated component outlet 19.

Figure 44:
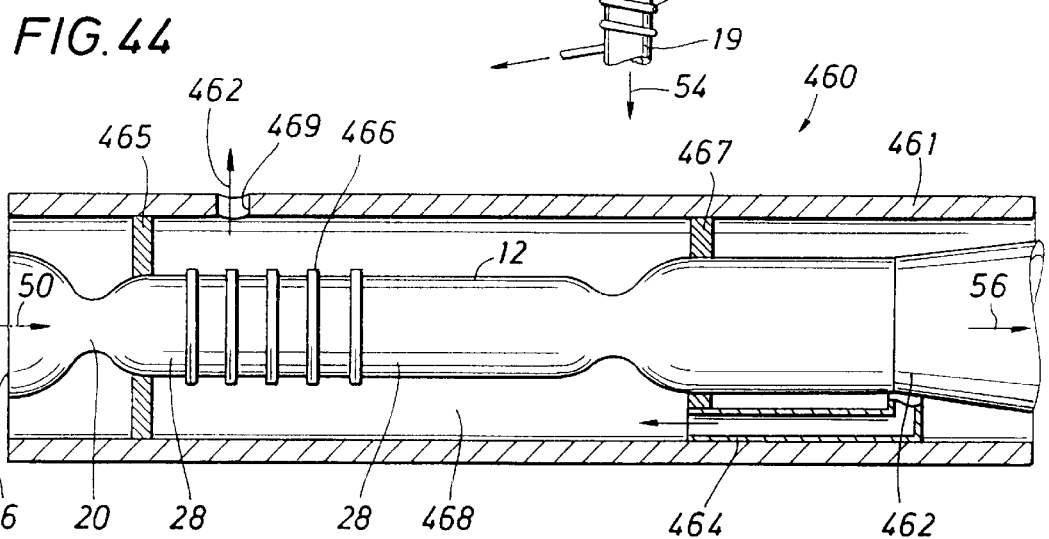
FIG. 44 is a partial cross-sectional view of a housing containing a conduit and showing cooling fins constructed in accordance with another embodiment of the invention.

In FIG. 44, there is shown a conduit 460, and an alternate method for decreasing the temperature of the separated component flow exiting the conduit 460. Conduit 460 is placed within a housing 461. The housing includes a first wall 465 and a second wall 467. The conduit 460 further includes an insulated connector 464, which receives a condensed output 462. The insulated connector 464 exits through the second wall 467 into a chamber 468. The housing 461 includes an orifice 469 through which the condensed output 462 may flow. Conduit 460 also includes a plurality of fins or cooling coils 466 extending radially outward from the wall 12. The fins 466 increase the surface area of the conduit 460. As the condensed output 462 travels from the insulated connector 464 to the orifice 469, it passes over the cooling coils 466. The cooling coils 466 radiate the cooling effect experienced in the supersonic passageway 28 caused by the supersonic velocity of the fluid stream 50 passing therethrough. Thus, the low temperature of the fluid stream 50 passing through the supersonic passageway 28 is transferred to the condensed output 462.

Figure 45:
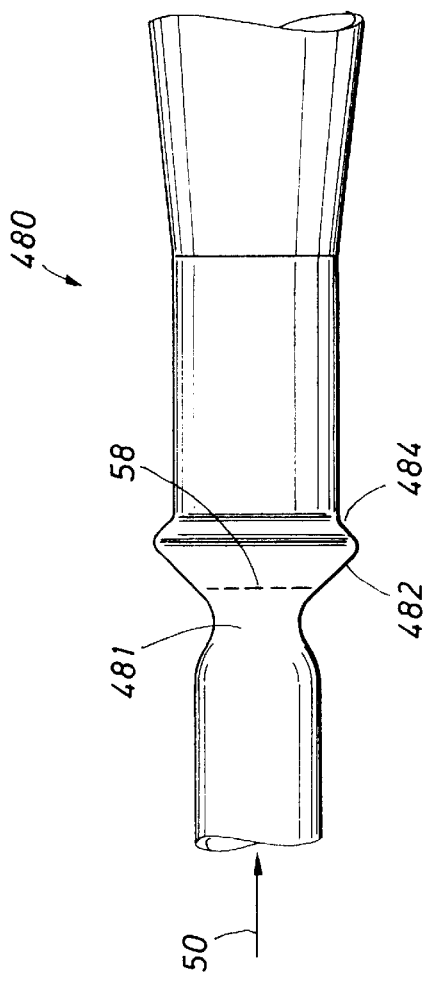
FIG. 45 is a partial side view of a diverging-converging diffuser portion of a conduit constructed in accordance with another embodiment of the invention.

Another embodiment of the present invention strengthens the swirl flow of the fluid stream 50 while concurrently limiting the temperature and pressure increases. A preferred example of this embodiment is shown in FIG. 45. In FIG. 45, there is a conduit 480 with a diffuser 481 having a different geometry than previously described diffusers. Specifically, on the downstream side of the diffuser 481 is a diverging section 482 followed by a converging section 484. The diverging section 482 decreases the velocity of the fluid stream 50 to subsonic flow, thereby creating a controlled final shock wave 58. The decreasing flow area of the converging section 484 diminishes the pressure and temperature increases in the fluid stream 50.

Another aspect of the invention relates to optimizing the heat balance of the entire system. Various methods may be used to optimize the heat balance of the separation system, including, for example, precooling the fluid stream prior to the is fluid entering the conduit 10.

Figure 46:
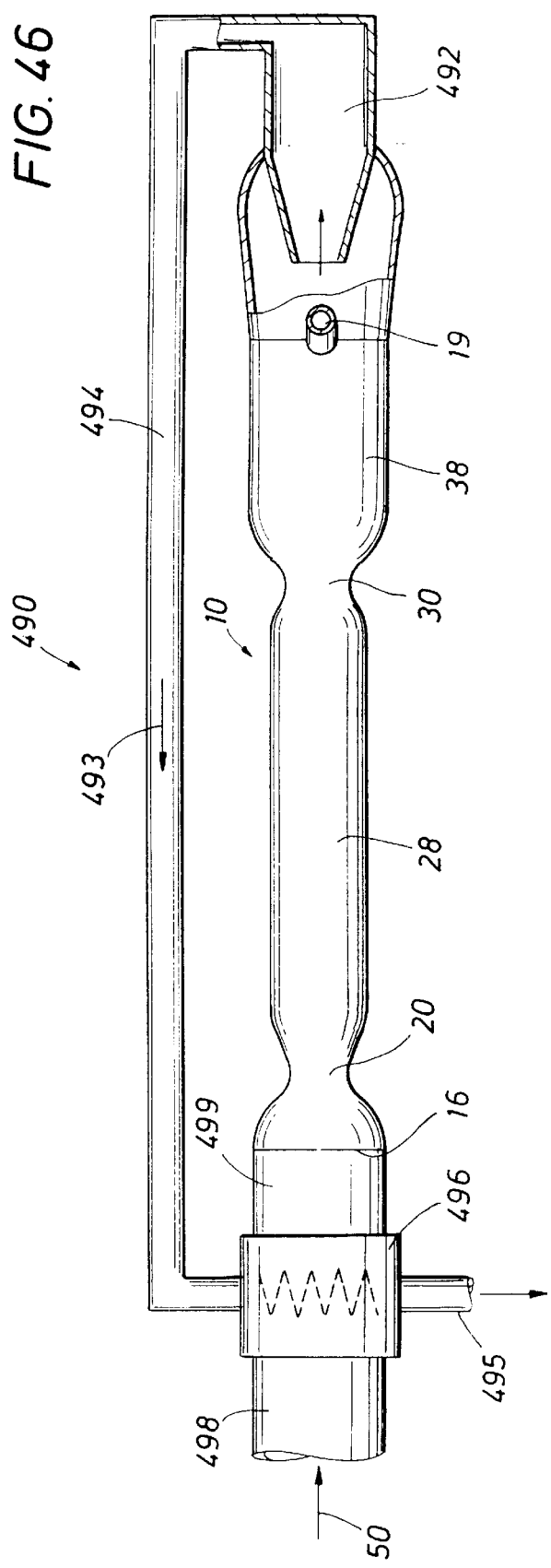
FIG. 46 is a side view of the conduit of FIG. 1 shown in conjunction with a heat exchanger upstream of the nozzle.

An apparatus 490 is shown in FIG. 46 including the conduit 10 and a heat exchanger 496. At the downstream end of the conduit 10 is included a vortex finder 492. The vortex finder 492 includes a recycling pipe 494 which leads into the heat exchanger 496. A recycled gas 493 exits the vortex finder 492 and travels through the recycling pipe 494 into the heat exchanger 496. The cooling aspect of the recycled gas 493 is transferred in the heat exchanger 496 to the fluid stream 50, which enters the heat exchanger 496 through a heat exchanger input 498. The precooled fluid stream 50 exits the heat exchanger 496 through a heat exchanger output 499 which connects to the inlet 16 of the conduit 10 and warmed recycled gas 493 exits the heat exchanger through warmed gas output 495.

Another configuration to optimize the heat balance of the system involves axial temperature isolation. Referring to FIG. 47, an apparatus 500 is shown including a conduit 10 positioned downstream of and connected with a flow pipe 509. An insulating ring 507 is placed between the flow pipe 509 and the inlet 16 of the conduit 10. Further insulating barriers 508 are strategically placed along the conduit 10. As illustrated, one insulating barrier 508 is placed at the nozzle 20, while another insulative barrier 508 is placed on a vortex finder 502 downstream of a condensed fluid outlet 504 of the conduit 10. A third insulating barrier 508 is placed at the opening of the condensed fluid outlet 504, while an insulating ring 506 is placed at the other end of the outlet 504. The insulating barriers 508 and the insulating rings 506, 507 prevent migration of heat along the conduit 10 in either the upstream or downstream directions.

One preferred method to achieve flow controllability is with a conduit having a variable diameter at certain strategic positions. FIGS. 48a–49 show various flow turndown apparatus. In FIGS. 48a–48b, a conduit 510 includes a vortex finder 514 as well as an actuator 512 which can buckle the conduit 510. Conduit 510 is composed of an elastic material such that placing the actuator or band 512 around the circumference of the conduit 510 will diminish the diameter of the conduit 510 as illustrated. By choosing particular sizes or diameters of the actuator or band 512, one can determine how much turndown the band 512 will provide to the conduit 510. With reference to FIG. 49, the conduit 510 is shown including a vortex finder 516. The vortex finder 516 differs from previously described vortex finders in that it is intended to schematically represent a vortex finder which is variable in shape and/or which can be variably positioned within the conduit 510, as shown schematically by the arrows I, J, respectively.

Other control mechanisms involve changing inlet pressure and temperature, or changing the cross-sectional flow area of the nozzle in order to achieve continuous turndown. The latter mechanism is one of the most effective ways to achieve continuous turndown of flow. It can be done using a stem body, variable nozzle geometry, or by injecting low-pressure gas. Injection of gas is currently preferred. The influence of gas injection on the conduit 10 is less severe than that from a stem body, which may cause strong gradients in the expansion profile. Further, control of the pressure and flow of the injected gas can assist in providing a smooth flow control for the main fluid stream. Finally, small amounts of low pressure gas may be produced in the secondary flow of the conduit 10.

Figure 56:
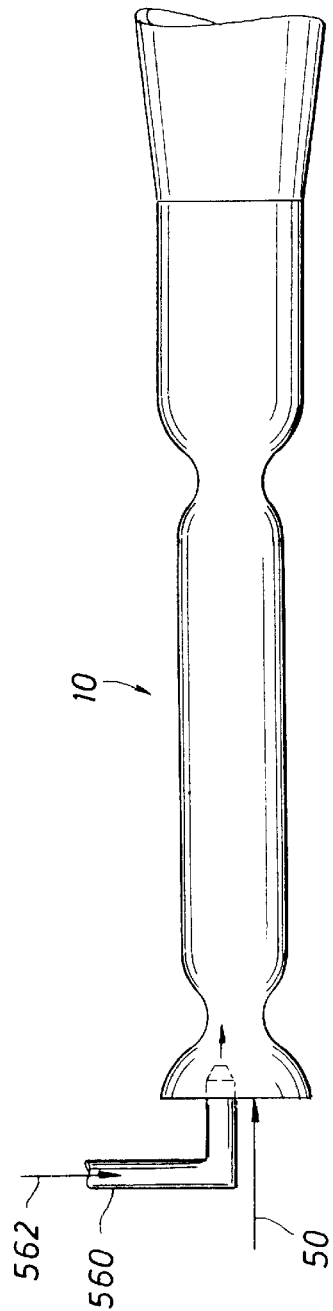
FIG. 56 is a side view of the conduit of FIG. 1 shown in conjunction with an injector/seeder inlet.

As shown in FIG. 56, the conduit 10 is joined with an injection/seeding inlet 560, which allows injection/seeding of stream 562. By placing an injection/seeding stream 562 into the conduit 10 along with the fluid stream 50, it is possible to seed the fluid stream 50 in the nozzle 20, thereby enhancing condensation and droplet formation, as will be discussed in more detail in connection with the nucleation arrangements set forth below.

For applications where it is desired to produce water from the fluid stream 50, glycol or any other hydrophilic substance can be injected into the nozzle through the injection/seeding inlet 560. The glycol will enhance the removal of water from the fluid stream 50, and the glycol can then be removed by any suitable method.

Figure 57A:
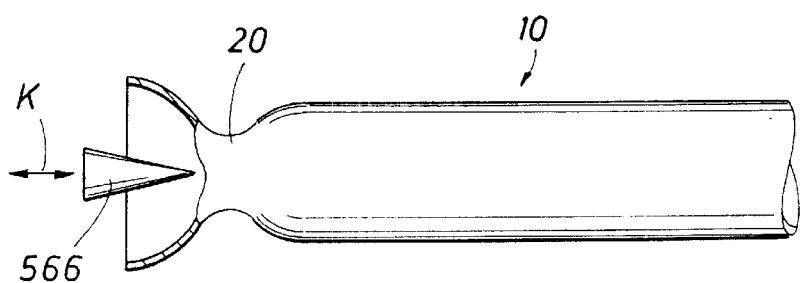
FIG. 57a is a partial cutaway side view of the conduit of FIG. 1 with a cutaway section showing a stem turndown.

In FIG. 57a, the conduit 10 includes an annular body 566 which is movable into and out of the nozzle 20 in the direction K. The annular body 566 acts as a turndown feature, as described above. The position of the annular body is variable, and therefore it is possible to control the inlet flow area of tie nozzle 20, thereby controlling and varying the flow.

Figure 57B:
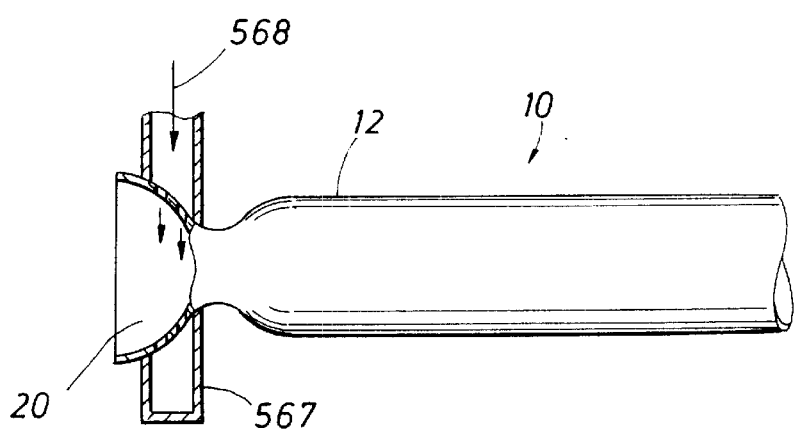
FIG. 57b is a partial side view of the conduit of FIG. 1 shown in conjunction with a low pressure turndown.

In FIG. 57b, the conduit 10 is shown in conjunction with a gas injection chamber 567. The wall 12 of the conduit 10 includes a porous section where the gas injection chamber is located. A gas 568 is injected from the gas injecting chamber 568 into the nozzle 20 of the conduit 10. By controlling the rate of injection of the gas 567, it is possible to control the nozzle 20 and turndown of the system.

Figure 50A:
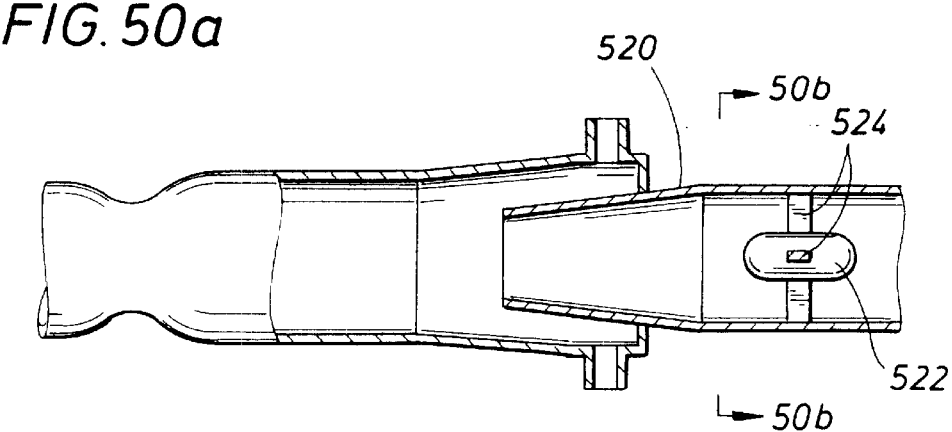
FIG. 50a is a partial cross-sectional view of a downstream portion of a conduit showing a vortex finder and a flow straightener constructed in accordance with another embodiment of the invention.
Figure 50B:
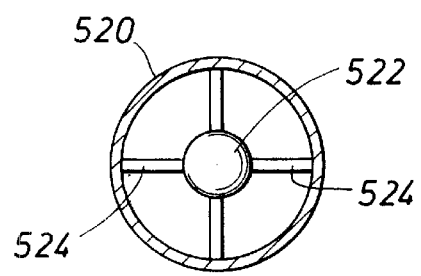
FIG. 50b is a cross-sectional view of the vortex finder of FIG. 50a taken along line L—L.
Figure 51A:
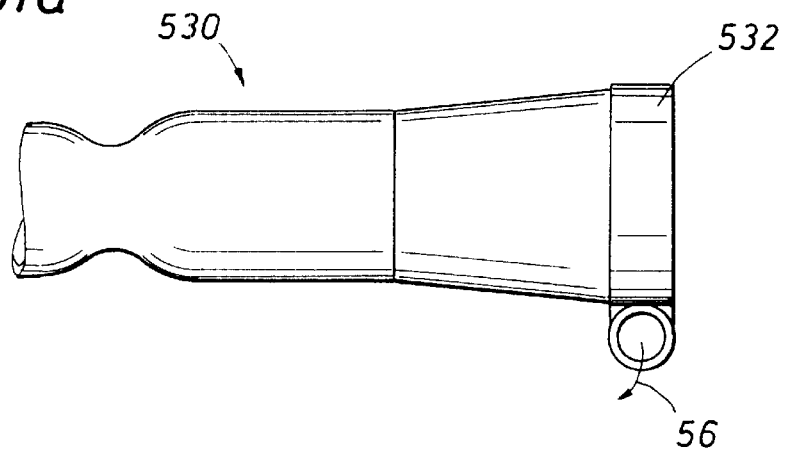
FIG. 51a is a partial side view of a downstream portion of a conduit showing a spiral casing constructed in accordance with another embodiment of the invention.
Figure 51B:
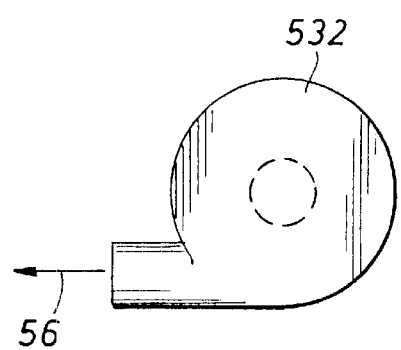

Another aspect of the present invention relates to the recovery of pressure. Recovering pressure after separation is important in order to reduce the amount of pressure that must be added to the system downstream. Any suitable arrangement for recovering pressure may be utilized, including, for example, the various apparatus shown in FIGS. 50a–51b. There is shown a vortex finder 520 in FIGS. 50a–50b including a vane 522 having a plurality of blades 524. The vane 522 and blades 524 straighten the swirl flow 52 into a straight flow. By so doing, pressure is recovered in the system as a whole. In FIGS. 51a–51b, there is shown a conduit 530 with a spiral casing 532 in the downstream portion. By transforming the swirl flow 52 into a spiral casing 532, the swirling flow is transformed into a straight flow, thereby recovering system pressure.

System Embodiments

It is of course possible to incorporate the conduit 10 into additional upstream and downstream equipment to enhance the operability of that equipment as well as to increase the efficiency of the entire system or process. FIGS. 52–55 illustrate several overall system embodiments.

The conduit 10 is shown in FIG. 52 in a system that includes a flare stack 535. By passing a fluid stream 50 through the conduit 10, and separating out and recovering a selected component of that fluid stream 50, the remainder of the fluid stream 50 may be introduced into the flare stack 535 for combustion. In this way, only a portion of the fluid stream 50 is combusted.

A conduit 540 is shown in FIG. 53 in a system with an adsorber 542 and an adsorber connector 544. A hydrocarbon fluid stream 546 having a certain specific gravity is passed through the adsorber 542. A portion of the fluid stream 50 having a different specific gravity than the fluid stream 546 is introduced into the adsorber 542 by way of the adsorber connector 544. The addition of a portion of the fluid stream 50 to the hydrocarbon fluid stream 546 through the adsorber 542 alters the specific gravity of the hydrocarbon fluid stream 548 exiting the adsorber 542. The portion of the fluid stream 50 may have a specific gravity lighter than the hydrocarbon fluid stream 546. Alternatively, if the object is to create a heavier fluid stream, the portion of the fluid stream 50 may have a specific gravity heavier than the hydrocarbon fluid stream 546.

With reference to FIGS. 54a–54b, a conduit 550 is placed vertically and it includes a horizontal tangential inlet 552 for the fluid stream 50. The conduit 550 further includes a tangential separator 554. The conduit 550 and separator 554 utilize gravitational forces to separate out the liquid portions of the fluid stream 50 from the gaseous portions, allowing gravity to force the liquid components downward and out through the base of the separator 554.

Figure 55:
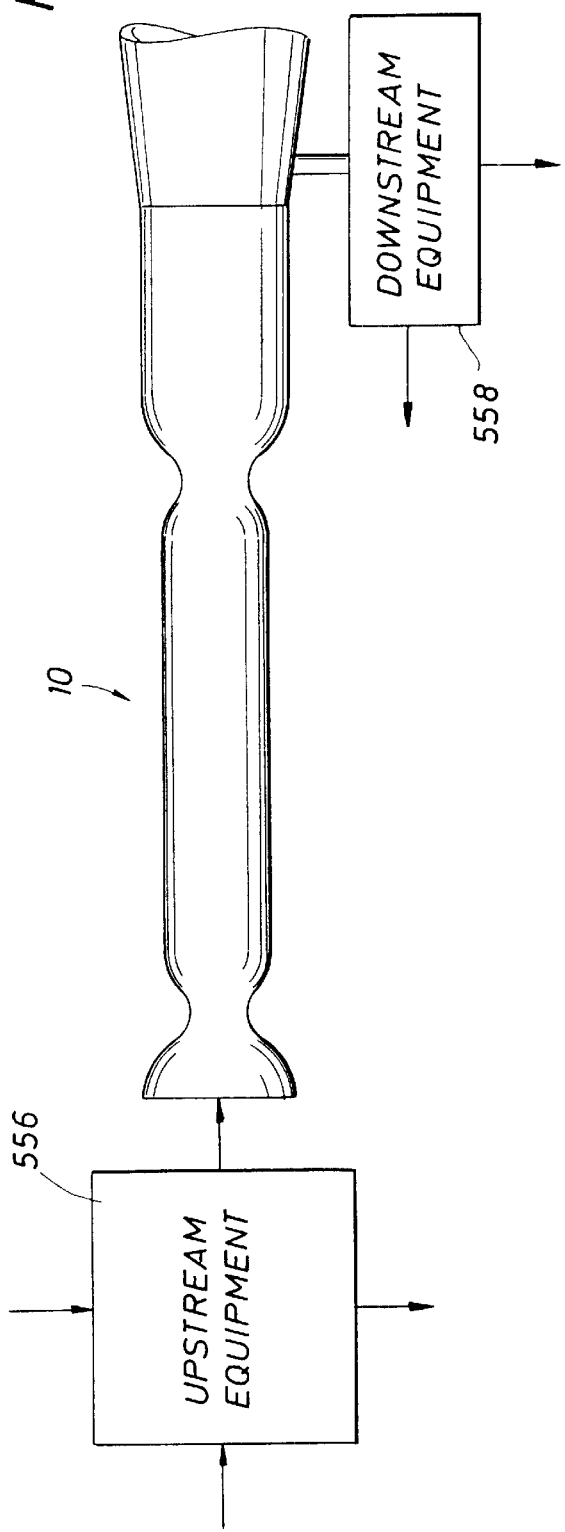
FIG. 55 is a schematic of a system containing the conduit of FIG. 1 in conjunction with upstream treating equipment and downstream treating equipment.
Figure 63:
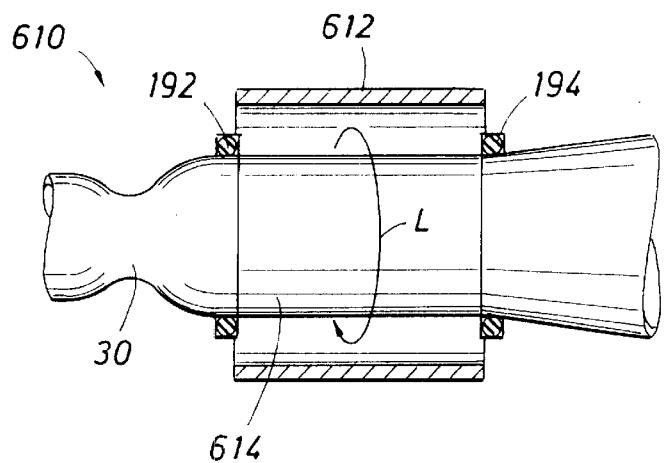
FIG. 63 is a partial side view of a downstream portion of a conduit shown in conjunction with a cross-sectional view of a stator constructed in accordance with another embodiment of the invention.

The conduit 10 in FIG. 55 is shown in conjunction with upstream equipment 556 and downstream equipment 558, which are schematically illustrated. A variety of upstream equipment 556 and downstream equipment 558 can be utilized in conjunction with the conduit 10. For example, the upstream treatment equipment may include a fuel cell utilizing either natural or synthetic fuel. Also, the downstream treatment equipment 558 may be, for example, a molsieve or a gas/liquid separator. Further drying of the fluid stream 50 is suitably achieved by introducing the outlet stream of collected particles into a gas/liquid separator to separate a gaseous fraction of the outlet stream from a liquid fraction thereof. Advantageously, the gaseous fraction of the outlet stream may be remixed with the fluid stream 50 induced to flow at supersonic velocity through the conduit 10. Another example is the use of a heat pump in conjunction with the conduit 10. An air/water mixture can be used as the fluid stream, and steam can be created and superheated in the conduit 10, and the steam portion of the stream then can be circulated through a heat pump. It is also possible to utilize the conduit in such a way as to create work which may be used in secondary operations. In FIG. 63, there is shown a conduit 610 including a rotating section 614, which is bounded by the O-rings 192, 194. A stator 612 surrounds the rotating section 614. The rotating section 614 rotates in the rotational direction L or the opposite direction of rotational direction L. As the fluid stream passes through the diffuser 30, the swirl flow of the now subsonic velocity fluid stream 50 causes rotation of the rotating section 614. The rotation of the rotating section 614 passes work to the stator 612, which transforms it into electricity which may be used in secondary operations.

It is also envisioned that the conduit 10 can be incorporated in air-conditioning systems, air-filtration systems, or the like. The controlled shock wave and separation can also be used to assist in disinfection processes, for example, to kill, inactivate, or separate a biologically active material from an air stream. In another embodiment, the apparatus can be a replacement for a Joule Tompson valve in a cryogenic plant.

Influencing Nucleation

As further described in U.S. patent application Ser. No. 09/223,888, now abandoned filed on even date herewith, incorporated herein in its entirety by reference, a preferred embodiment of the present invention relates to the growth of nuclei to forms particles of a separable size. At supersonic flow velocities, the fluid stream 50 decreases in temperature over the length of the supersonic passageway 28. As the temperature of the fluid stream 50 drops, the temperature of the fluid stream 50 as a whole will drop to and below the dew point temperature of the selected components to be separated from the fluid stream 50. As the temperature decreases, the fluid stream 50 becomes more saturated. This saturation leads to nucleation, or the creation of small nuclei. In general, the heavier components of a hydrocarbon fluid stream have a higher dew point temperature than the lighter components, and hence the heavier components will condense and begin the process of nucleation earlier than the lighter components. In addition to nucleation, the particles formed will advantageously grow in size as the fluid stream 50 travels through the nozzle 20 and/or conduit 10.

The nucleation process may be enhanced through the injection of components, e.g., particles. Such injection may take place in the nozzle 20 or the supersonic passageway 28. The injected material may be any suitable material for increasing the number of nuclei of the separated component forming in the separation apparatus. Preferably, a sufficient amount of solid particles are injected to achieve a density within the conduit 10 of between about $10^{12}$ to $10^{14}$, and more preferably, about $10^{13}$ particles per cubic meter. In applications where electrostatic or magnetic forces are used to enhance separation of components, it is further possible to influence the nucleation process by seeding charged particles as condensation nuclei.

Growth of the nucleated particles is another important aspect of the invention. As a general rule, it is easier to centrifugally separate particles of larger size. Thus, in certain applications, it is desirable to interrupt or inhibit nucleation. By interrupting nucleation, fewer nucleated particles are produced in the fluid stream 50, and therefore with increased, saturation levels these fewer particles will grow to a relatively larger size.

Nucleation interruption may be accomplished in a variety of ways,'such as, for example, injecting a gas to create a boundary layer, which can reduce expansion.

Figure 62:
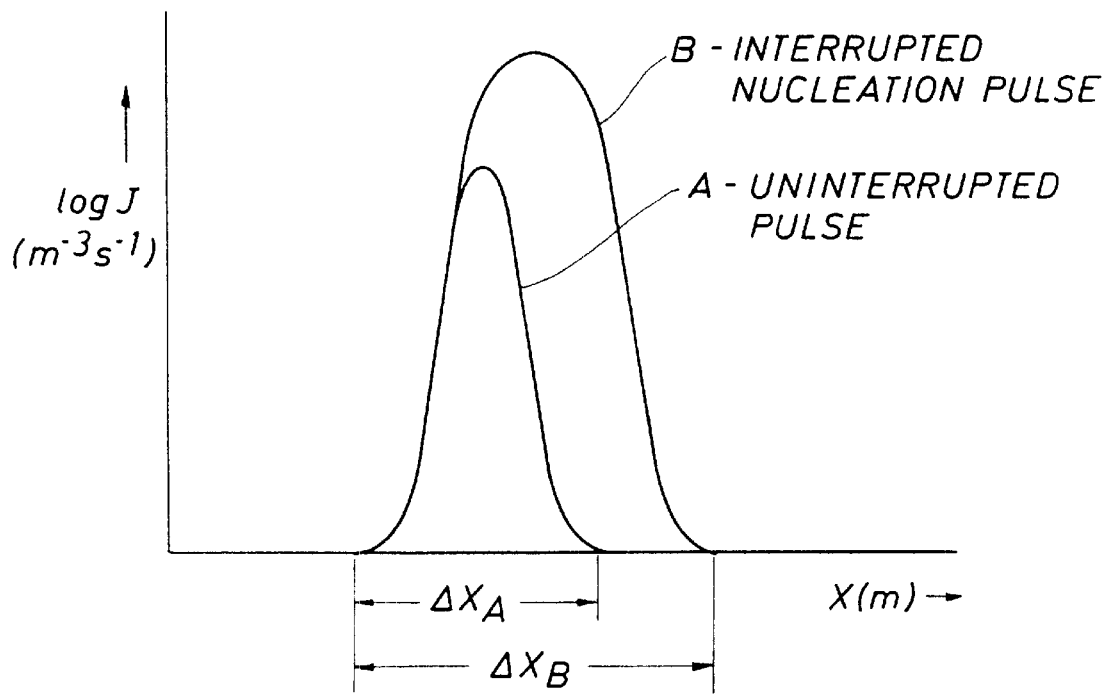
FIG. 62 is a graphical representation of the change in the nucleation rate of a fluid flow over distance for a conduit having a nucleation pulse interrupter and for a conduit lacking a nucleation pulse interrupter.

With reference to FIG. 62, there is shown a graph plotting the saturation number S over length. The graph 62 shows two curves. Curve A relates to a conduit including a nucleation pulse interrupter. Curve B relates to a conduit lacking a nucleation pulse interrupter. As is shown by the graph at FIG. 62, the conduit having a nucleation pulse interrupter obtains a lower nucleation rate and allows for nucleation over a smaller distance than the conduit lacking a nucleation pulse interrupter. The significance of the graph shown in FIG. 62 is that it indicates that interrupting nucleation can result in the formation of fewer particles which grow to a larger size, which may be more easily separated.

Figure 58A:
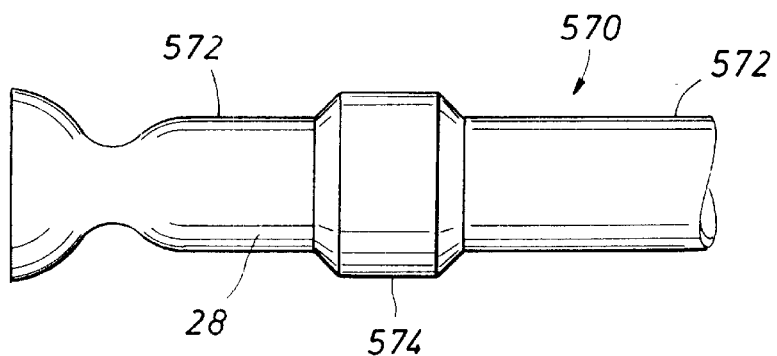
FIG. 58a is a partial side view of a conduit shown with a nucleation pulse interrupter constructed in accordance with another embodiment of the invention.
Figure 58B:
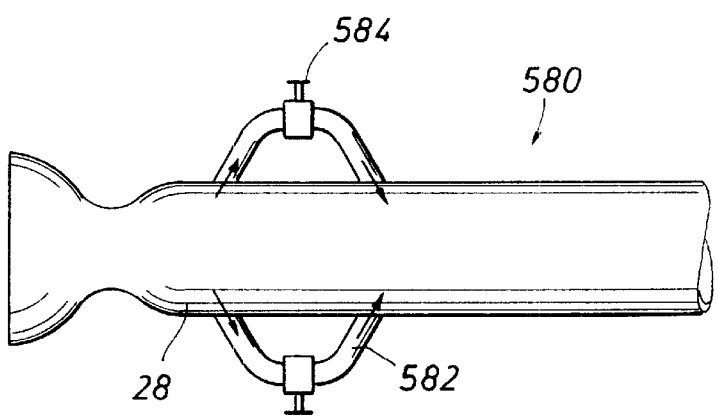
FIG. 58b is a partial side view of a conduit shown with a boundary layer nucleation pulse interrupter constructed in accordance with another embodiment of the invention.
Figure 58C:
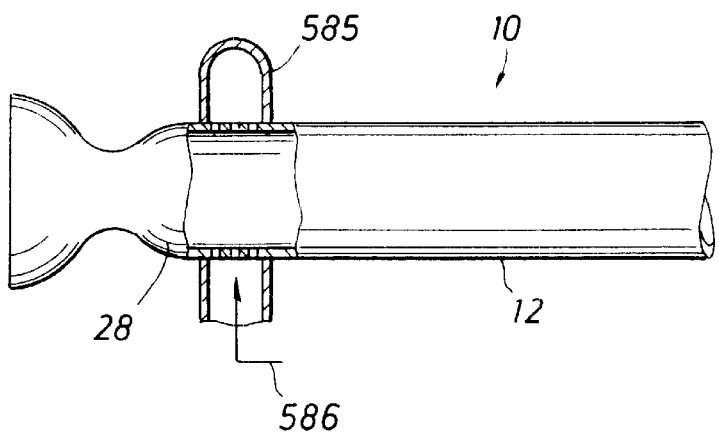
FIG. 58c is a partial side view of the conduit of FIG. 1 shown with a secondary gas nucleation pulse interrupter.

With reference to FIGS. 58a–58c, there are illustrated conduits constructed in accordance with various alternative nucleation pulse interruption embodiments of the invention. In FIG. 58a, a conduit 570 is shown having a first diameter 572 and a second diameter 574. The second diameter 574 is greater than the first diameter 572. By including the second diameter 574 within the supersonic passageway 28 extra expansion will occur, but upon the subsequent downstream decrease of diameter, compression occurs and nucleation is interrupted or inhibited.

In FIG. 58b, a conduit 580 is shown having a looped passageway 582 and corresponding valving 584. As with the previously described embodiment in FIG. 58a, the looped passageway 582 provides initially for extra expansion (by withdrawing fluid flow), but subsequently compression, thereby interrupting nucleation. The valving provides variability to the conduit 580 so that the amount of flow through the looped passageway may be inhibited or halted completely. Therefore, the conduit 580 is applicable to a variety of applications and fluid stream compositions.

In FIG. 58c, the conduit 10 is shown with a gas injection chamber 585 which injects a gas 586 through a porous region of the wall 12 of the conduit 10. The gas 586 may be from an external or secondary source of gas. The addition of the gas 586 into a supersonic passageway 28 similarly functions to interrupt nucleation. Though not illustrated, another alternative embodiment of a nucleation pulse is interrupter includes a pair of throats, or areas of restricted cross-sectional flow, one following another.

EXAMPLE

An exemplary conduit for separating water vapor from air at ambient conditions is described. The apparatus can be used to remove water vapor form air in central air-conditioning installations or exhaust air from dry-chambers. Typically 15% to 30% of the water vapor must be separated in order to achieve the desired humidity. The air flow-rates in these applications are typically in the order of 10,000 to greater than 100,000 $m^3$/hr.

In the apparatus, air is pressurized to 1.4 bar by a blower and then cooled to between 25–30° C. where the air is near water saturation (RV=90%). The air is then fed to the apparatus according to the present invention where the water liquids are separated with a small amount of slip air coming along with the water liquid stream.

The apparatus of the present example had a tubular flow duct although similar results can be achieved for rectangular or asymmetric duct cross sections. The inlet conditions to the apparatus are summarized below:

1. Mass flow rate: 1.2 kg/s
2. Inlet pressure: 1400 mbar(abs)
3. Inlet temperature: 25° C.
4. Inlet humidity: 90%

The device establishes the condensation of the water vapor, resulting in a flow containing a large number of water droplets, typically $10^3/m^3$. Therefore the final temperature (T) and pressure (P) have to be determined such that the water .vapor fraction becomes negligibly small. In this case, T=−28° C. and P=680 mbar(abs.).

With respect to nozzle size, the nozzle throat cross-section is calculated to obtain the required flow rate. Considering the inlet conditions above, the throat diameter was on the order of 70 mm. The inlet diameter is 300 mm. The nozzle outlet diameter is 80 mm so as to obtain supersonic flow conditions, with typically Mach number M=1.15.

The length of the nozzle is determined by the cooling speed, which for this case is 19,000° K./s. The cooling speed determines the droplet size distribution. Limiting the value of the cooling speed results in large average droplet sizes. The resulting lengths (L1 and L2) of the nozzle are:

L1: 700 mm: from nozzle inlet to nozzle throat
L2: 800 mm: from nozzle throat to nozzle outlet In order to decrease frictional losses the wall roughness is chosen to be small, i.e., 1 micron. Depending on the application, any rigid material can be used for the nozzle device, as long as the above mentioned design parameters are taken into account.

The vortex tube is connected between the nozzle outlet and the diffuser. In the vortex tube a wing-like, swirl imparting internal is present. At the edge of this wing a vortex is created on the upper (low-pressure) side and shed from the plane, preferably at the trailing edge. The cord of the wing is attached to the inner wall of the vortex tube.

The sizing of the vortex tube is related to the nozzle outlet diameter, which is the inlet diameter of the vortex tube, i.e. 80 mm. In this case, the vortex tube is slightly conical, which means that the diameter increases linearly to 84 mm over a length of approximately the cord length of the wing.

After that the vortex tube diameter is constantly 84 mm over a length where the droplets will be depositing on the inner wall (separation length). These two mentioned lengths are on the order of:

L3: 300 mm (from wing apex to wing trailing edge)
L4: 300 mm (from wing trailing edge to diffuser)

The sizing of the wing is dependant on the circulation or integral vorticity.

This circulation is typically 16 $m^2$/s and is determined by a wing cord length of about 300 mm, a wing span at the trailing edge is about 60 mm and at an incidence of the wing cord to the axis of the tube of 8°. The sweepback angle of the leading edge is 87° and the sweepback angle of the trailing edge is about 40°. The edges of the wing are sharp having a top-angle of less then 3°. The plane of the wing is flat and its profile is extremely slender, due to the small thickness, typically about 4 mm at the root.

In the drainage section, the withdrawal of liquids out of the vortex tube is obtained. The drainage section is not a sharp distinguished device but is an integral part of the vortex tube, by means of slits, porous materials, holes in the vortex tube walls; or is an integral part of the diffuser by means of a vortex finder (co-axial duct). In this example, a vortex finder is used and is placed centrally in the duct after the shock wave, which is present directly after the vortex tube in the first diffuser part.

The sizing of the vortex tube focuses on the diameter ratio between local diffuser diameter (90 mm) and vortex finder inlet diameter (85 mm). The cross-sectional area difference between the latter two determines the minimal flow, which is extracted from the main stream containing the liquids. In this example, the minimal flow is 10% of the main flow i.e. 0.12 kg/s.

In the diffuser the remaining kinetic energy in the flow is transformed to potential energy (increase of static pressure), thus avoiding boundary layer separation which can cause stall resulting in a bad efficiency. Therefore the halve divergence angle of the diffuser should be preferably less then 5 and in this example it was 4°. The diffuser inlet diameter is the same as the vortex finder inlet diameter (85 mm). Since the outlet diameter in this case is 300 mm, the diffuser length has to be 1500 mm.

The performance of the device is measured by means of two humidity sensors both at the air inlet and dried air outlet, corrected by T and P measurements. The typical values of the inlet water fractions were 18–20 grams of water vapor per kg dry air. The typical values of the outlet water fractions were 13–15 grams of water vapor per kg dry air. This can be expressed as a separation efficiency of about 25%.

The above description and drawings are only illustrative of certain preferred embodiments which achieve the objects, features and advantages of the present invention. The present invention is not to be considered as limited to these specific embodiments, but is only limited by the scope of the appended claims.

What is claimed as new and desired to be protected by Letters Patent of the United States is:

1. A conduit for separating one or more components from a compressible fluid having a plurality of components, said conduit comprising
    a proximal end having an inlet and a nozzle in fluid communication with said conduit, said nozzle being adapted to propel said fluid axially into said conduit at at least sonic velocity,
    a distal subsonic velocity flow end having at least one primary outlet for said separated component, and at least one secondary outlet, one of said primary and secondary outlets being located in a radially outer portion of said conduit and the other of said primary and secondary outlets being located in a radially inner portion of said conduit,
    an intermediate member located between said proximal and distal ends and having at least one surface protruding into said at least sonic axial flow so as to impinge angularly upon said flow and impart a tangential flow component to said flow, and
    a collection zone located downstream of said intermediate member and having said at least one primary outlet for collecting said separated component from said distal subsonic velocity end of said conduit.

2. The conduit of claim 1 further comprising an axial velocity deceleration zone located downstream of said intermediate member and upstream of said at least one primary outlet, said axial velocity deceleration zone having a surface which varies the fluid flow cross sectional area of said conduit so as to reduce said axial flow relative to said tangential flow component.

3. The conduit of claim 2 further comprising a deceleration zone of both axial and tangential velocity, located downstream of said axial velocity deceleration zone so as to reduce both axial and tangential velocity.

4. The conduit of claim 2 wherein said axial velocity deceleration zone comprises a diffuser.

5. The conduit of claim 2 wherein said deceleration zone further comprises a means for inducing a shock wave.

6. The conduit of claim 2 wherein said deceleration zone comprises a supersonic diffuser.

7. The conduit of claim 2 wherein said collection zone includes a radially outward collection zone for collecting said separated component from said compressible fluid.

8. The conduit of claim 4 wherein said collecting zone is located adjacent the outlet end of the diffuser.

9. The conduit of claim 1 wherein the at least one surface is a wing having a subsonic leading edge and a subsonic trailing edge.

10. A conduit for separating one or more components from a stream of compressible fluid, wherein said fluid flows at supersonic velocity in an upstream portion of said conduit and at subsonic velocity within a downstream portion of said conduit, said conduit comprising
    an inlet end having an inlet nozzle in fluid communication with the upstream supersonic flow portion of said conduit, said inlet end being adapted to propel said fluid axially into said conduit at at least sonic velocity,
    an outlet end in the downstream subsonic flow portion of said conduit and having at least one primary stream outlet, for said one or more separated components, and at least one secondary stream outlet, wherein one of said primary and secondary stream outlets is located in a radial portion of said conduit and the other of said primary and secondary stream outlets is located in a central portion of said conduit, and
    a wing member having at least one surface protruding into the supersonic fluid portion of said conduit, said surface being positioned to impinge angularly upon said axial flow to create a tangential flow component.

11. The conduit of claim 10 wherein said at least one surface has a half-delta shape, a subsonic leading edge at an angle of about seventy degrees or higher, a span of about one-half to three-quarters the diameter of said conduit, and a subsonic trailing at an angle in the range of about thirty degrees to about 50 degrees.

12. The conduit of claim 11 wherein said at least one surface has a span of about two-thirds the diameter of said conduit.

13. The conduit of claim 11 wherein said at least one surface of said wing member is perpendicular to the wall of said conduit.

14. The conduit of claim 11 wherein said surface has an angle of incidence in the range of from about two degrees to about twenty degrees and a cord length of about six diameters or more of said conduit.

15. An apparatus for separating one or more components from a stream of compressible fluid flowing at supersonic and subsonic velocities within a conduit, said apparatus comprising
    a conduit having an inlet end adapted to propel said fluid into said conduit at supersonic velocity so as to condense particles of said one or more components in a supersonic flow section of said conduit,
    at least one surface protruding into the supersonic fluid flow, said surface being adapted to impinge upon said flow to create a tangential flow component and centrifugal force acting upon said particles, a collection zone having a plurality of perforations in the wall of said conduit for collecting said particles of one or more separated components from a radially outer portion of the subsonic flow section of said conduit, and an outlet for remaining fluid flow through a radially inner portion of said conduit after separation of said one or more separated components.

16. An apparatus for separating one or more selected components from a compressible fluid, comprising a conduit having an inlet end adapted to propel said fluid axially into said conduit at supersonic velocity, at least one surface protruding into the supersonic fluid flow, said surface being adapted to impinge upon said flow to create a tangential supersonic flow component, a collection zone having a plurality of perforations for removing at least a portion of said one or more selected components in a subsonic flow section of said conduit, and a vortex finder for collection of the remaining fluid flow after removal of said one or more selected components.

17. The apparatus of claim 16 wherein said at least one surface has a half-delta shape and a sharp subsonic leading edge at an angle of about seventy degrees or higher.

18. The apparatus of claim 16 wherein said at least one surface has a span of about one half to about three-quarters the diameter of said conduit.

19. The apparatus of claim 16 wherein said at least one surface has a subsonic trailing edge at an angle in the range of about thirty degrees to about fifty degrees.

20. A conduit for removing a selected gaseous component from a stream of fluid containing a plurality of components, comprising:

a nozzle for inducing said stream to flow at supersonic velocity through said conduit so as to decrease the temperature of the fluid to below a selected temperature at which one of condensation and solidification of the selected component occurs thereby forming particles of the selected component, at least one internal surface which imparts a swirling motion to the stream of fluid, thereby inducing the particles to flow to a radially outer section of the stream, an axial velocity reducing section downstream of said at least one internal surface so as to decrease the axial velocity of the fluid to subsonic velocity, and at least one outlet for extracting the particles into an outlet stream from said radially outer section of the collecting zone, wherein the outlet is downstream from the axial yelocity reducing section of said conduit.

21. The conduit of claim 20 wherein the axial velocity reducing section comprises a diffuser.

22. The conduit of claim 20 wherein the at least one outlet is located adjacent the downstream end of the axial velocity reducing section.

23. The conduit of claim 20 wherein said at least one outlet comprises a perforation in the wall of said conduit.

24. A system for transfer of a compressible fluid and separation of one or more components of said fluid, comprising:

a compressible fluid source having a plurality of components;

a conduit for separating a component from said compressible fluid source, said conduit comprising a proximal end having an inlet and a nozzle in fluid communication with said conduit, said nozzle being adapted to propel said fluid axially into said conduit at at least sonic velocity, a distal subsonic velocity flow end having at least one primary outlet for said separated component, and at least one secondary outlet, one of said primary and secondary outlets being located in a radially outer portion of said conduit and the other of said primary and secondary outlets being located in a radially inner portion of said conduit, an intermediate member located between said proximal and distal ends and having at least one surface protruding into said at least sonic axial flow so as to impinge angularly upon said flow and impart a tangential flow component to said flow, and a collection zone located downstream of said intermediate member and having said at least one primary outlet for collecting said separated component from said distal subsonic velocity end of said conduit.

25. An apparatus for separating a component from a stream of compressible fluid, comprising a conduit adapted to propel said fluid from a supersonic upstream velocity to a downstream subsonic velocity, whereby cooling of said fluid in the upstream supersonic velocity causes condensation of droplets of said one or more components, said conduit including an inlet end and an outlet end, said outlet end having at least one primary outlet for said one or more separated components and at least one secondary outlet wherein one of said primary and secondary stream outlets is located in a radial portion of said conduit and the other of said outlets is located in a central portion of said conduit, and a one half-delta sharp edge wing impinging upon said supersonic flow between said inlet end and outlet end to cause a swirling motion of said flow, said swirling motion having an axial supersonic flow component and a tangential supersonic flow component, said wing having a span of about one-half to about three-quarters the diameter of said conduit, an incidence angle in the range of about two degrees to about twenty degrees, and a trailing edge in the range of about thirty degrees to about 50 degrees.

26. An apparatus for separating one or more components from a stream of compressible fluid, comprising a conduit adapted to propel said fluid from a supersonic upstream velocity to a downstream subsonic velocity, whereby cooling of said fluid in the upstream supersonic velocity causes condensation of droplets of said one or more components, said conduit including an inlet end and an outlet end, said outlet end having at least one primary outlet for said one or more separated components and at least one secondary outlet wherein one of said primary and secondary stream outlets is located in a radial portion of said conduit and the other of said outlets is located in a central portion of said conduit, a swirl imparting surface adapted to impinge angularly upon said supersonic flow between said inlet end and outlet end to cause a swirling motion of said flow, said swirling motion having an axial supersonic flow component and a tangential supersonic flow component, the tangential flow imparting a centrifugal force to said droplets, and a subsonic flow section of the conduit adapted for the extraction of said droplets from the radial outlet.

* * * * *